(12) United States Patent
Higashinaka et al.

(10) Patent No.: US 8,526,512 B2
(45) Date of Patent: Sep. 3, 2013

(54) TRANSMITTING APPARATUS AND RECEIVING APPARATUS

(75) Inventors: Masatsugu Higashinaka, Tokyo (JP); Tomoya Yamaoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 42 days.

(21) Appl. No.: 13/119,890

(22) PCT Filed: Jul. 24, 2009

(86) PCT No.: PCT/JP2009/063275
§ 371 (c)(1),
(2), (4) Date: Mar. 18, 2011

(87) PCT Pub. No.: WO2010/032554
PCT Pub. Date: Mar. 25, 2010

(65) Prior Publication Data
US 2011/0176622 A1  Jul. 21, 2011

(30) Foreign Application Priority Data
Sep. 18, 2008  (JP) .................................. 2008-239704

(51) Int. Cl.
*H04L 27/00*  (2006.01)

(52) U.S. Cl.
USPC ........... 375/259; 375/267; 375/260; 375/232; 375/230; 370/294; 370/329; 370/344; 370/328; 455/571; 455/127.1

(58) Field of Classification Search
USPC ................. 375/259, 316, 295, 267, 260, 230; 370/329, 344, 328, 338
See application file for complete search history.

(56) References Cited

U.S. PATENT DOCUMENTS
8,009,727 B2 * 8/2011 Hui et al. ...................... 375/230
2007/0004465 A1 * 1/2007 Papasakellariou et al. ... 455/571
(Continued)

FOREIGN PATENT DOCUMENTS
| | | |
|---|---|---|
| WO | 2007 091590 | 8/2007 |
| WO | 2008 007506 | 1/2008 |
| WO | 2008 081876 | 7/2008 |
| WO | 2009 069630 | 6/2009 |

OTHER PUBLICATIONS
"Consideration on Multicarrier Transmission Scheme for LTE-Adv Uplink, 3GPP TSG RAN WG1 Meeting #53bis, R1-082398", Panasonic, Agenda item: 12, Discussion, pp. 1-3, ( Jun. 30-Jul. 4, 2008).

(Continued)

*Primary Examiner* — Eva Puente
(74) *Attorney, Agent, or Firm* — Oblon, Spivak, McClelland, Maier & Neustadt, L.L.P.

(57) ABSTRACT

A transmitting apparatus that converts a transmission digital signal to a high-frequency analog signal and transmits the high-frequency analog signal using a plurality of transmission frequencies, the transmitting apparatus including: a dividing unit that divides a transmission signal sequence into a plurality of blocks; a sub-block generating unit that applies pre-coding processing to the blocks and further divides the blocks after the pre-coding processing into sub-blocks; a frequency allocating unit that generates a frequency signal in which the sub-blocks are allocated to the transmission frequencies; and an inverse DFT processing unit that transforms the frequency signal into a time signal, wherein the transmitting apparatus sets the time signal as the transmission digital signal.

17 Claims, 13 Drawing Sheets

(56) References Cited

U.S. PATENT DOCUMENTS

| | | | |
|---|---|---|---|
| 2007/0183384 A1* | 8/2007 | Kwak et al. | 370/338 |
| 2007/0286302 A1* | 12/2007 | Hwang et al. | 375/267 |
| 2008/0219341 A1* | 9/2008 | Kim | 375/232 |
| 2009/0052427 A1 | 2/2009 | Oketani et al. | |
| 2009/0316626 A1* | 12/2009 | Lee et al. | 370/328 |
| 2010/0098177 A1 | 4/2010 | Hamaguchi et al. | |
| 2010/0254484 A1 | 10/2010 | Hamaguchi et al. | |
| 2011/0064069 A1* | 3/2011 | Lipka | 370/344 |
| 2011/0075651 A1* | 3/2011 | Jia et al. | 370/344 |
| 2011/0085479 A1* | 4/2011 | Kim et al. | 370/294 |

OTHER PUBLICATIONS

"Uplink MIMO Transmission for LTE-Advanced, 3GPP TSG RAN WG1 Meeting #54 R1-082943", LG Electronics, Agenda item: 12, Discussion, pp. 1-5, (Aug. 18-22, 2008).

"Uplink Multiple Access Schemes for LTE-A, 3GPP TSG RAN WG1 #54 R1-082945", LG Electronics, Agenda Item: 12, Discussion, pp. 1-12, (Aug. 18-22, 2008).

"Uplink Multiple Access for LTE-Advanced, 3GPP TSG RAN WG1 #54 R1-082776", Mitsubishi Electric, Agenda item: 12, Discussion, pp. 1-4, (Aug. 18-22, 2008).

"Uplink Multiple Access for LTE-Advanced, RAN WG1 Meeting #53bis R1-082609", Nokia Siemens Networks, Nokia, Agenda Item: 12, pp. 1-11, (Jun. 30-Jul. 4, 2008).

"Interleaved Antenna Grouping for Clustered DFT-S-OFDM, 3GPP TSG RAN WG1 Meeting #57 R1-092164", Alcatel-Lucent Shanghai Bell Alcatel-Lucent, Agenda Item: 15.5, Discussion, pp. 1-5 (May 4-8, 2009).

"Performance Comparison of UL MIMO in OFDMA vs. SC-FDMA, 3GPP TSG-RAN WG1 Meeting #55bis R1-090125", Huawei, Agenda item: 12.1, Discussion and Decision, pp. 1-7, (Jan. 12-16, 2009).

"Multiple Sub-Band Transmission for SC-FDMA in LTE-A, 3GPP TSG-RAN WG1#55bis R1-090152", Nortel, Agenda item: 12.1, Discussion/Decision, pp. 1-3, (Jan. 12-16, 2009).

"UL 4 TX Antennas Transmit Diversity for LTE-Advanced, 3GPP TSG RAN WG1#54 R1-083021", Huawei, Agenda item: 12, Discussion/Decision, pp. 1-11 (Aug. 18-22, 2008).

Zhu, Xu et al., "Novel Frequency-Domain Equalization Architectures for a Single-Carrier Wireless MIMO System", IEEE VTC2002, vol. 24-28, pp. 874-878, (Sep. 2002).

"3GPP TR 36.814 V0.4.1, $3^{rd}$ Generation Partnership Project; Technical Specification Group Radio Access Network; Further Advancements for E-UTRA Physical Layer Aspects (Release 9)", LTE, pp. 1-2, (Feb. 2009).

International Search Report issued Sep. 15, 2009 in PCT/JP09/063275 filed Jul. 24, 2009.

Supplementary European Search Report issued in European Application No. 09 81 4399 on Apr. 2, 2013.

Sharp: "Issues on Architecture Alternatives for LTE-Advanced", 3GPP Draft; R1-082789, $3^{rd}$ Generation Partnership Project (3GPP), Mobile Competence Centre: 650, Route Des Lucioles; F-06921 Sophia-Antipolis Cedex; France, No. Jeju; 20080812, Aug. 12, 2008, XP050316281, [retrieved on Aug. 12, 2008] figures 1, 2.

Office Action dated Mar. 20, 2013 in Chinese Patent Application No. 200980136505.8 (with partial English-language translation).

* cited by examiner

TRANSMITTING APPARATUS AND RECEIVING APPARATUS

TECHNICAL FIELD

The present invention relates to a transmitting apparatus and a receiving apparatus in a communication system that employs frequency division multiple access.

BACKGROUND ART

An SC-FDMA (Single Carrier Frequency Division Multiple Access) system as an example of a signal transmission system in digital radio communication can realize high transmission power efficiency and high frequency usage efficiency. In general, a transmitter that performs signal transmission using the SC-FDMA system has a function of performing discrete Fourier transform and inverse discrete Fourier transform. First, the discrete Fourier transform is executed on a transmission signal symbol sequence to create frequency domain data of a transmission symbol sequence. Thereafter, the frequency domain data of the transmission symbol sequence is allocated to a predetermined frequency in a system band. The inverse discrete Fourier transform is applied to a result of the allocation to create an SC-FDMA transmission signal.

In recent years, as a method as expansion of the SC-FDMA system, a technology having a plurality of SC-FDMA transmission systems corresponding to different frequency bands in one transmitter is disclosed (see, for example, Non Patent Literature 1 described below). In this technology, it is possible to deal with a wideband system by combining SC-FDMA transmission signals generated by the respective SC-FDMA transmission systems and transmitting this combined signal. The technology is disclosed in, for example, Non Patent Literature 1 described below.

Non Patent Literature 1: Nokia Siemens Networks, Nokia, "R1-082609: Uplink Multiple Access for LTE-Advanced", 3GPP TSG RAN WG1 Meeting #53bis Warsaw, Poland, Jun. 30-Jul. 4, 2008.

DISCLOSURE OF INVENTION

Problem to be Solved by the Invention

However, according to the conventional technology, the SC-FDMA transmission systems present in the transmitter have configurations capable of respectively allocating a signal only to predetermined frequency bands, respectively. Therefore, there is a problem in that wide system bandwidth cannot be effectively used.

In the conventional technology, a signal finally transmitted from the transmitter is a combined signal of a plurality of SC-FDMA transmission signals. Therefore, there is a problem in that a peak to average power ratio (PAPR) is high.

The present invention has been made in view of the above and it is an object of the present invention to obtain a transmitting apparatus and a receiving apparatus that can effectively use a wide system band while suppressing a PAPR.

Means for Solving Problem

A transmitting apparatus according to an aspect of the present invention converts a transmission digital signal to a high-frequency analog signal and transmits the high-frequency analog signal using a plurality of transmission frequencies, the transmitting apparatus including: a block dividing unit that divides a transmission signal sequence into one or more blocks; a pre-coding unit that applies pre-coding processing to the blocks; a sub-block dividing unit that further divides the blocks after the pre-coding processing into sub-blocks; a frequency allocating unit that generates a frequency signal in which the sub-blocks are allocated to the transmission frequencies; and an inverse discrete Fourier transform unit that transforms the frequency signal into a time signal, wherein the transmitting apparatus sets the time signal as the transmission digital signal.

Effect of the Invention

According to the present invention, the transmitter divides an information bit sequence into blocks of a plurality of systems, converts each of the blocks into blocks in the frequency domain using encoding processing, symbol generation processing, and DFT processing, further divides each of the blocks of the frequency domain into a plurality of sub-blocks, and allocates the sub-blocks to desired frequencies in a system band. Therefore, there is an effect that it is possible to effectively use a wide system band while suppressing a PAPR.

BEST MODE(S) FOR CARRYING OUT THE INVENTION

Embodiments of a transmitting apparatus and a receiving apparatus according to the present invention are explained in detail below based on the drawings. The present invention is not limited by the embodiments.

First Embodiment

Figure 1:
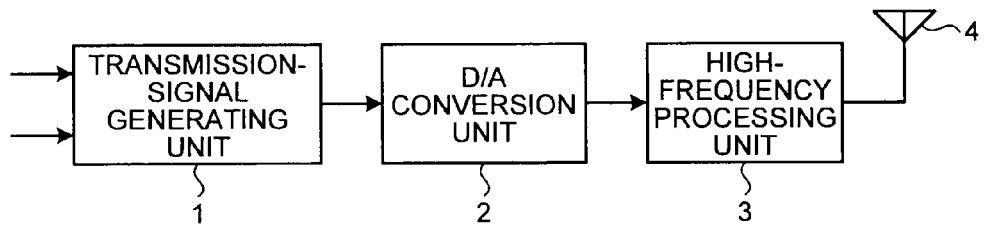
FIG. 1 is a diagram of a functional configuration example of a transmitting apparatus.

FIG. 1 is a diagram of a functional configuration example of a first embodiment of a transmitting apparatus (hereinafter referred to as transmitter) according to the present invention. As shown in FIG. 1, the transmitting apparatus according to this embodiment includes a transmission-signal generating unit 1, a D/A (Digital-to-Analog) conversion unit 2, a high-frequency processing unit 3, and a transmission antenna 4 as characteristic components of the present invention.

The transmission-signal generating unit 1 generates a digital transmission signal sequence of a baseband based on an information bit sequence, which includes information desired to be transmitted from the transmitter to a receiving apparatus (hereinafter referred to as receiver), and a control signal for controlling the operation of the transmitter. Then, the transmission-signal generating unit 1 outputs the digital transmission signal sequence to the D/A conversion unit 2. The D/A conversion unit 2 converts the input digital transmission signal sequence of the baseband into an analog transmission signal, and outputs the analog transmission signal to the high-frequency processing unit 3. The high-frequency processing unit 3 applies predetermined high-frequency signal processing such as up-convert to the input analog transmission signal, and generates a high-frequency analog transmission signal. Finally, the high-frequency analog transmission signal is transmitted via the transmission antenna 4.

Figure 2:
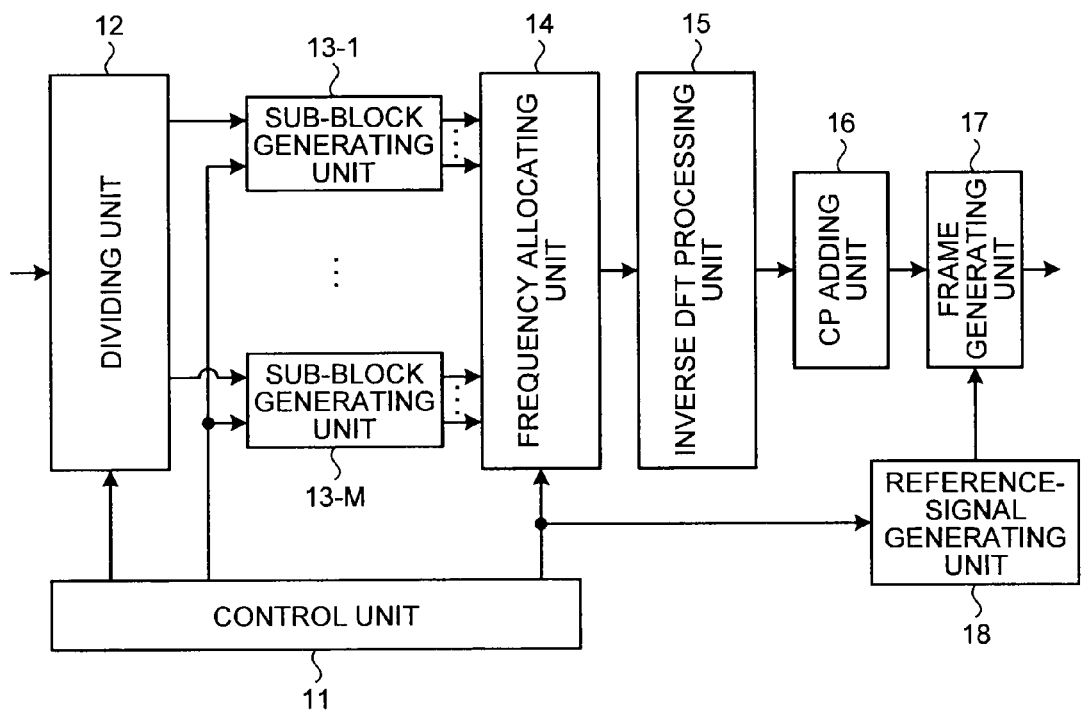
FIG. 2 is a diagram of a configuration example of a transmission-signal generating unit of a transmitter according to a first embodiment.

A configuration example and the operation of the transmission-signal generating unit 1, which are characteristics of the present invention, are explained in detail below. FIG. 2 is a diagram of a configuration example of the transmission-signal generating unit 1 of the transmitter according to this embodiment. As shown in FIG. 2, the transmission-signal generating unit 1 according to this embodiment includes a control unit 11, a dividing unit 12, sub-block generating units 13-1 to 13-M (M is an integer equal to or larger than 1), a frequency allocating unit 14, an inverse DFT (Discrete Fourier Transform) processing unit 15, a CP (Cyclic Prefix) adding unit 16, a frame generating unit 17, and a reference-signal generating unit 18. An information bit sequence input to the transmission-signal generating unit 1 is input to the dividing unit 12.

First, the control unit 11 creates parameters to be output to the components of the transmission-signal generating unit 1. Specifically, in the example shown in FIG. 2, the control unit 11 determines the division number M, which is used by the dividing unit 12 to divide an information bit sequence into blocks, and notifies the dividing unit 12 of the division number M. The control unit 11 determines encoding methods and modulating systems each used by each of the sub-block generating units 13-1 to 13-M, and the division number of sub-block L necessary in processing for dividing blocks into sub-blocks explained later. Then, the control unit 11 notifies the sub-block generating units 13-1 to 13-M of the encoding method, the modulating system, and the sub-block division number L. The control unit 11 notifies the frequency allocating unit 14 and the reference-signal generating unit 18 of information (hereinafter referred to as frequency information) including a frequency (hereinafter referred to as working frequency) used by the transmitter for signal transmission in a system band. Specific processing carried out by the components are explained later.

The dividing unit 12 executes processing for dividing an input information bit sequence into M blocks. A specific numerical value of M is notified from the control unit 11. The M blocks are output to the respective sub-block generating units 13-1 to 13-M.

Figure 3:
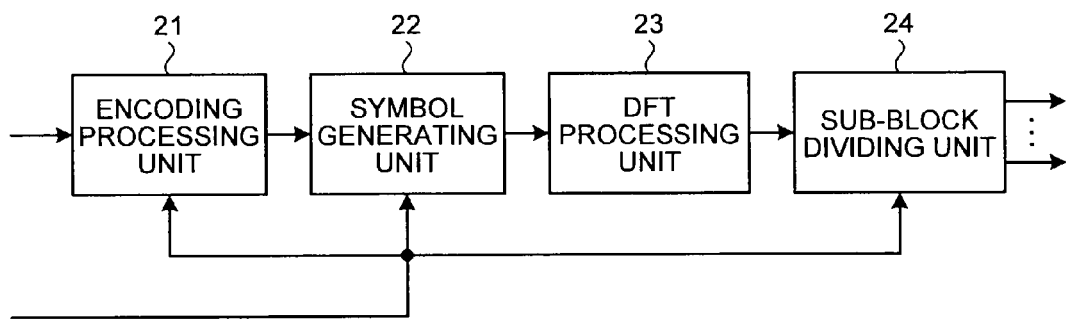
FIG. 3 is a diagram of a configuration example of a sub-block generating unit.

A configuration example of the sub-block generating units 13-1 to 13-M is explained below. FIG. 3 is a diagram of a configuration example of the sub-block generating unit 13-1. Because the M sub-block generating units 13-1 to 13-M adopt the same configuration, the configuration example of the sub-block generating unit 13-1 is representatively illustrated in FIG. 3. As shown in FIG. 3, the sub-block generating unit 13-1 according to this embodiment includes an encoding processing unit 21, a symbol generating unit 22, a DFT processing unit 23, and a sub-block dividing unit 24.

The block input from the dividing unit 12 is input to the encoding processing unit 21. Parameters of the encoding method, the modulating system, and the number of sub-block divisions L input from the control unit 11 are input to the encoding processing unit 21, the symbol generating unit 22, and the sub-block dividing unit 24, respectively.

The encoding processing unit 21 applies error correction encoding to the input block according to the encoding method notified from the control unit 11, and generates an encoded bit sequence. Concerning a specific encoding method, for example, an arbitrary method such as a well-known convolutional code, turbo code, or LDPC code can be applied. There is no limit concerning an encoding ratio or the like. Although not shown in the example shown in FIG. 3, the encoding method may include interleave processing for interchanging an arrangement of the encoded bit sequence according to necessity. The generated encoded bit sequence is output to the symbol generating unit 22.

The symbol generating unit 22 generates, with respect to the input encoded bit sequence, a symbol sequence according to the modulation scheme notified from the control unit 11. As the modulation scheme used here, any modulation scheme can be used. However, for example, a publicly-known modulation scheme such as QPSK (Quadrature Phase Shift Keying) that represents 2 bits with 1 symbol or 16 QAM (Quadrature Amplitude Modulation) that can represents 4 bits with 1 symbol can be applied. The generated symbol sequence is output to the DFT processing unit 23.

The DFT processing unit 23 executes DFT (Discrete Fourier Transform) on the input symbol sequence for one block and generates a block in the frequency domain. The block in the frequency domain is output to the sub-block dividing unit 24. Processing of the DFT processing unit 23 is equivalent to pre-coding processing carried out in the SC-FDMA system. Therefore, the DFT processing unit 23 can be considered pre-coding means. The pre-coding processing is not limited to this. Any pre-coding processing can be carried out.

The sub-block dividing unit 24 divides, based on the sub-block division number L notified from the control unit 11, the input block in the frequency domain into L sub-blocks. The L sub-blocks generated by the division are output to the frequency allocating unit 14 shown in FIG. 2.

The frequency allocating unit 14 performs processing for arranging (allocating) M sub-blocks input from the sub-block generating units 13-1 to 13-M in predetermined working frequencies based on the working frequency information notified from the control unit 11, and arranging zero in frequencies other than the working frequencies in the system band.

Figure 4:
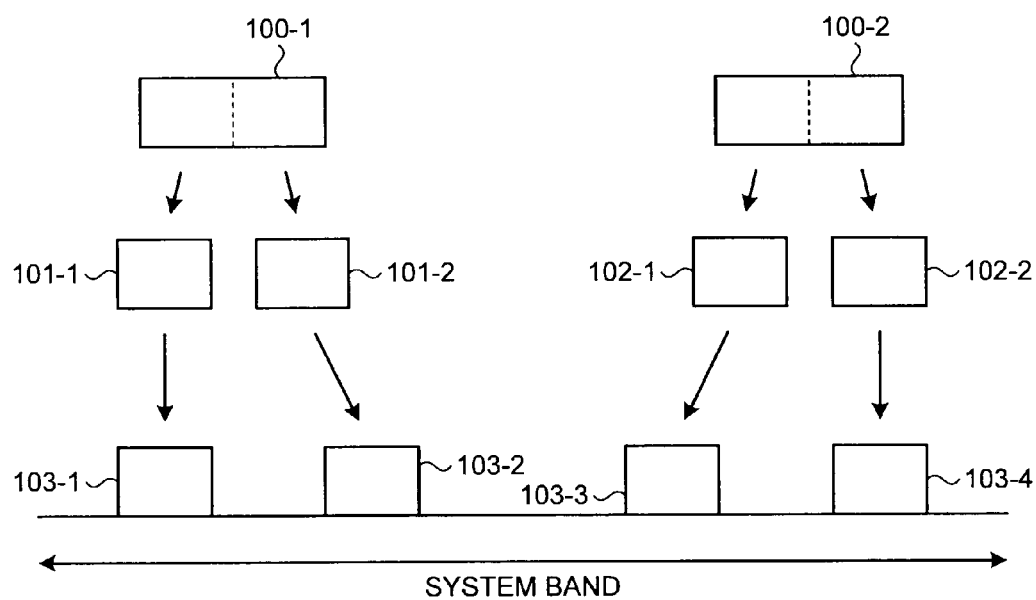
FIG. 4 is a diagram of a concept of an example of processing of a frequency allocating unit.

FIG. 4 is a diagram of a concept of an example of the processing of the frequency allocating unit 14. In FIG. 4, a case in which M=2 and the sub-block division number L=2 for each of the blocks is illustrated. A processing image of the frequency allocating unit 14 is shown in the figure. Blocks 100-1 and 100-2 shown in FIG. 4 indicate the blocks in the frequency domain generated by the DFT processing units 23 of the sub-block generating units 13-1 and 13-2, respectively, shown in FIG. 2. Sub-blocks 101-1 and 101-2 indicate sub-blocks generated by the sub-block dividing unit 24 of the sub-block generating unit 13-1 dividing the block 100-1. Sub-blocks 102-1 and 102-2 indicate sub-blocks generated by the sub-block dividing unit 24 of the sub-block generating unit 13-2 dividing the block 100-2.

Sub-blocks 103-1 to 103-4 indicate sub-blocks after the respective sub-blocks 101-1, 101-2, 102-1, and 102-2 are allocated to predetermined frequency bands by the frequency allocating unit 14. In the example shown in FIG. 4, each of the two blocks in the frequency domain (100-1 and 100-2) generated by the DFT processing units 23 of the sub-block generating units 13-1 to 13-2 is divided into two sub-blocks by each of the sub-block dividing units 24 in the sub-block generating units 13-1 to 13-2 (101-1 and 101-2, 102-1 and 102-2, etc.). Therefore, because M=2, as a result, four sub-blocks are passed to the frequency allocating unit 14.

The frequency allocating unit 14 performs processing for arranging the input four sub-blocks to the working frequencies notified from the control unit 11 and not arranging any signal in the other frequency bands in the system band (103-1 to 103-4). Finally, the frequency allocating unit 14 outputs a frequency domain signal equivalent to the entire system band to the inverse DFT processing unit 15 shown in FIG. 2.

The inverse DFT processing unit 15 applies processing of inverse DFT to the input frequency domain signal equivalent to the entire system band to generate a transmission signal sequence in the time domain. The inverse DFT processing unit 15 outputs the transmission signal sequence in the time domain as a processing result to the CP adding unit 16.

The CP adding unit 16 copies the tail end of the transmission signal sequence in the time domain and adds the tail end to the top of the transmission signal sequence in the time domain as a CP (Cyclic Prefix). The length of the CP is set to be longer than, for example, a maximum delay time of a delay wave due to multipath propagation. The CP adding unit 16 outputs the transmission signal sequence in the time domain after the CP addition to the frame generating unit 17.

On the other hand, unlike processing for the information bit sequence explained above, the reference-signal generating unit 18 generates a reference signal known between the transmitter and the receiver. The receiver uses this reference signal to measure a response of a radio channel between the transmitter and the receiver. The response of the radio channel includes an impulse response and a frequency transfer function.

Figure 5:
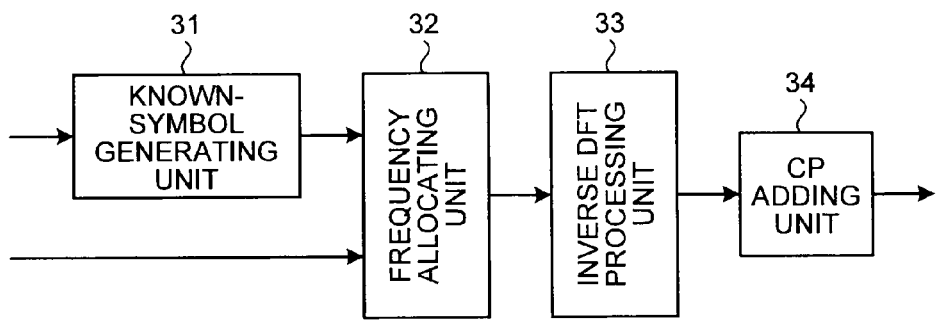
FIG. 5 is a diagram of a configuration example of a reference-signal generating unit.

FIG. 5 is a diagram of a configuration example of the reference-signal generating unit 18. As shown in FIG. 5, the reference-signal generating unit 18 according to this embodiment includes a known-symbol generating unit 31, a frequency allocating unit 32, an inverse DFT processing unit 33, and a CP adding unit 34. The working frequency information input from the control unit 11 shown in FIG. 2 is input to the frequency allocating unit. An operation example of the reference-signal generating unit 18 is explained in detail below with reference to FIG. 5.

First, the known-symbol generating unit 31 outputs a known-symbol held by the transmitter and the receiver in advance to the frequency allocating unit 32. The frequency allocating unit 32 performs, based on the working frequency information notified from the control unit 11, processing for arranging the known symbol input from the known-symbol generating unit 31 in the working frequencies in the system band and not arranging any signal in the frequencies other than the working frequencies in the system band. Then, the frequency allocating unit 32 outputs a frequency domain signal equivalent to the entire system bandwidth after the processing to the inverse DFT processing unit 33.

In the same manner as the inverse DFT processing unit 15 shown in FIG. 2, the inverse DFT processing unit 33 applies the processing of inverse DFT to the input frequency domain signal to generate a reference signal in the time domain. The inverse DFT processing unit 15 outputs the reference signal in the time domain to the CP adding unit 34. Thereafter, the CP adding unit 34 copies the tail end of the reference signal in the time domain to the top as a CP and outputs the reference signal to the frame generating unit 17 shown in FIG. 2.

Figure 6:
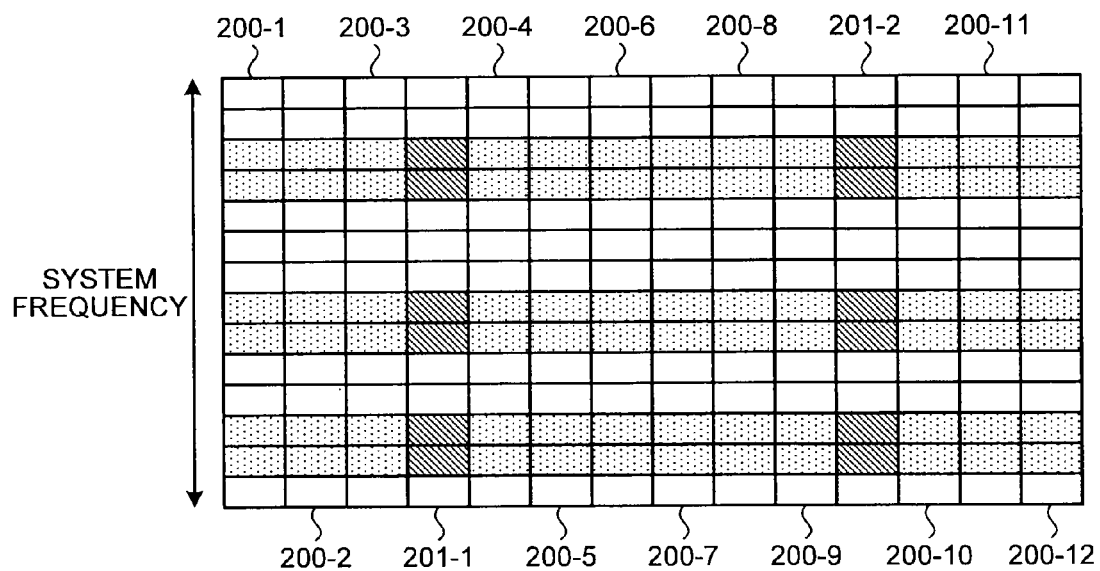
FIG. 6 is a diagram showing a frame configuration example according to the first embodiment.

The frame generating unit 17 shown in FIG. 2 arranges the transmission signal sequence in the time domain after the CP addition input from the CP adding unit 16 and the reference signal in the time domain after the CP addition input from the reference-signal generating unit 18 such that a predetermined frame configuration is obtained. FIG. 6 is a diagram of a frame configuration example according to this embodiment. Transmission signal sequences 200-1 to 200-12 shown in FIG. 6 indicate twelve transmission signal sequences in the time domain after the CP addition. Reference signals 201-1 and 201-2 indicate two reference signals in the time domain after the CP addition. Dark painted portions shown in FIG. 6 indicate frequencies to which the known symbols are allocated. Light painted portions indicate portions to which sub-blocks are allocated. Un-painted portions indicate frequencies to which signals are not allocated.

In FIG. 6, time is shown in the lateral direction and frequency components of time domain signals are shown in the longitudinal direction. The transmission signal sequences in the time domain after the CP addition input to the frame generating unit 17 and the reference signals in the time domain after the CP addition are multiplexed in the time direction to form one frame. As explained above, in the transmission signal sequences and the reference signals, respective signal components are allocated to the same frequencies (the working frequencies). A processing result of the frame generating unit 17 is output to the D/A conversion unit 2 shown in FIG. 1 and, as explained above, after being subjected to the predetermined processing in the D/A conversion unit 2 and the high-frequency processing unit, transmitted from the transmission antenna 4.

Figure 7:
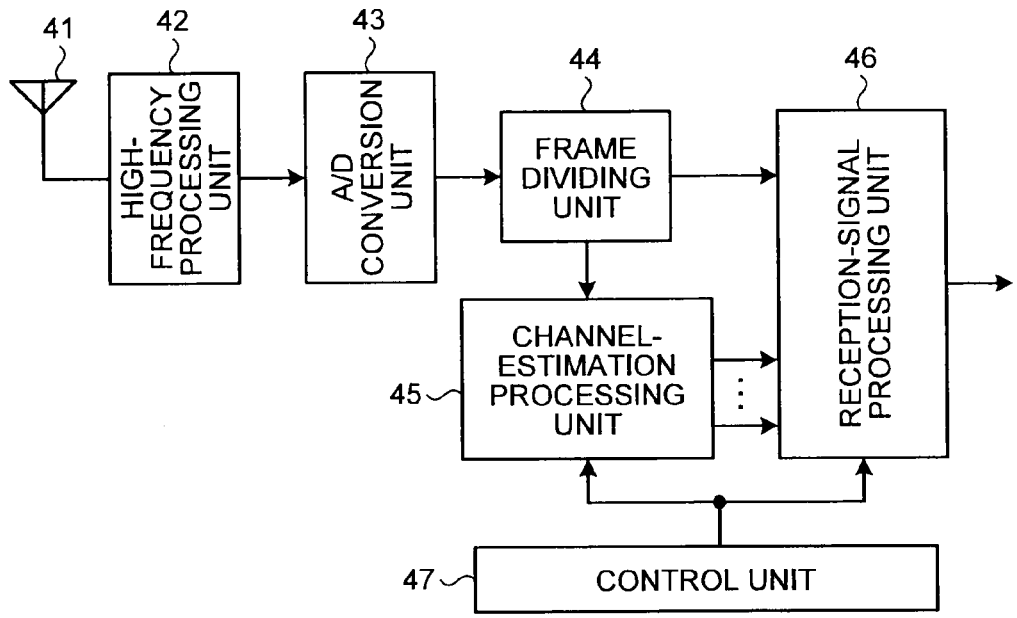
FIG. 7 is a diagram of a configuration example of a receiver according to the first embodiment.

The operation of the receiver according to this embodiment is explained below. FIG. 7 is a diagram of a configuration example of the receiver according to this embodiment. As shown in FIG. 7, the receiver according to this embodiment includes a reception antenna 41, a high-frequency processing unit 42, an A/D conversion unit 43, a frame dividing unit 44, a channel-estimation processing unit 45, a reception-signal processing unit 46, and a control unit 47. An operation outline of the receiver according to this embodiment is explained with reference to FIG. 7.

The reception antenna 41 receives a high-frequency analog signal. The high-frequency processing unit 42 applies predetermined high-frequency signal processing such as downconvert to a baseband to the high-frequency signal and converts the high-frequency analog signal into a baseband analog reception signal. The A/D conversion unit 43 converts the baseband analog reception signal into a baseband digital reception signal. In the following explanation, the baseband digital reception signal is referred to as reception frame. The A/D conversion unit 43 outputs the reception frame to the frame dividing unit 44.

The frame dividing unit 44 divides the reception frame into a portion in which a transmission signal sequence is arranged (hereinafter referred to as reception signal sequence) and a portion in which a reference signal are arranged (hereinafter referred to as reception reference signal), and outputs the portions to the reception-signal processing unit 46 and the channel-estimation processing unit 45, respectively. The channel-estimation processing unit 45 estimates, using the reception reference signal, a response of a radio channel through which a signal is propagated and outputs an estimation result to the reception-signal processing unit 46.

The reception-signal processing unit 46 executes demodulation processing and decoding processing based on the reception signal sequence and the estimation result of the response of the radio channel, and finally outputs an estimation value of an information bit sequence. Detailed processing of the reception-signal processing unit 46 and the channel-estimation processing unit 45 are explained later. On the other hand, the control unit 47 determines parameters necessary for the channel-estimation processing unit 45 and the reception-signal processing unit 46 to execute predetermined signal processing, and notifies the channel-estimation processing unit 45 and the reception-signal processing unit 46 of the parameters. In the example shown in FIG. 7, the block division number M, the sub-block division number L for the each block, and information concerning a frequency used by the transmitter for signal transmission in the system band (a working frequency) are notified to the channel-estimation processing unit 45 as parameters. Parameters concerning an encoding methods and modulation schemes used by the blocks are also notified to the reception-signal processing unit 46 in addition to the above parameters. In the following explanation, operation examples of the channel-estimation processing unit 45 and the reception-signal processing unit 46 are explained in detail.

Figure 8:
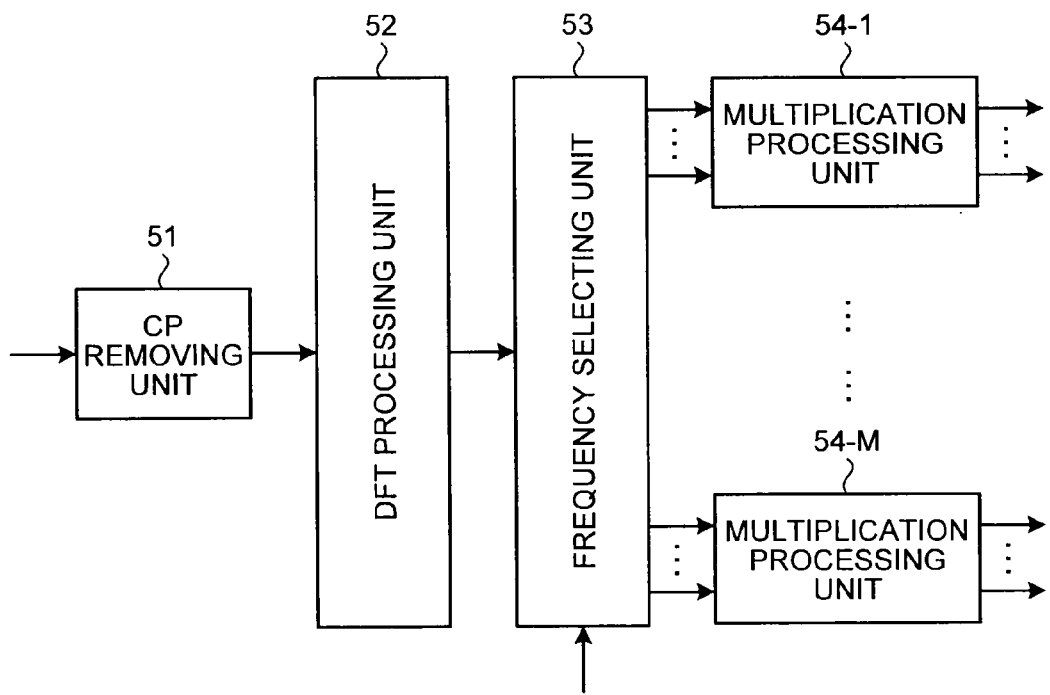
FIG. 8 is a diagram of a configuration example of a channel-estimation processing unit.

FIG. 8 is a diagram of a configuration example of the channel-estimation processing unit 45. As shown in FIG. 8, the channel-estimation processing unit 45 according to this embodiment includes a CP removing unit 51, a DFT processing unit 52, a frequency selecting unit 53, and multiplication processing units 54-1 to 54-M. The reception reference signal input to the channel-estimation processing unit 45 is input to the CP removing unit 51. The parameters input from the control unit 47 are input to the frequency selecting unit 53.

The channel-estimation processing unit 45 outputs a frequency transfer function of the radio channel between the transmitter and the receiver. Processing of the channel-estimation processing unit 45 is explained in detail below.

The CP removing unit 51 removes a CP from the reception reference signal and outputs a result of the removal of the CP to the DFT processing unit 52. The DFT processing unit 52 executes DFT on the reception reference signal to thereby generate a reception reference signal in the frequency domain and outputs the generated reception reference signal to the frequency selecting unit 53.

The frequency selecting unit 53 extracts, based on the working frequency information, the block division number M, and the sub-block division number L notified from the control unit 47, only signals in frequencies, to which the known symbol is allocated, from the input reception reference signal in the frequency domain and outputs the signals to the multiplication processing units 54-1 to 54-M. As explained concerning the operation of the transmitter, in the transmitter, the known symbol as the reference signals is arranged in frequencies same as the frequencies to which the sub-blocks are allocated. In the following explanation, each of the signals output from the frequency selecting unit 53 to each of the multiplication processing units 54-1 to 54-M is referred to as "reception reference signal for each sub-block".

The multiplication processing units 54-1 to 54-M store in advance the known symbol transmitted as the reference signals. Each of the multiplication processing units 54-1 to 54-M performs processing for calculating complex conjugate of the known symbol, multiplies the "reception reference signal for each sub-block" input thereto with the complex conjugate, and dividing a multiplication result with a value obtained by raising the known symbol to the second power.

The processing is explained more in detail using formulas. A reception signal and a transmitted known symbol of an ith frequency are represented by x and d, respectively. A frequency transfer function and a noise component of a radio channel in the ith frequency are represented by h and n, respectively. In this case, the following Formula (1) holds:

$$x = hd + n \quad (1)$$

Therefore, when the processing of the multiplication processing units 54-1 to 54-M explained above is executed, a processing result in the ith frequency can be represented by the following Formula (2):

$$d^*x/|d|^2 = h + d^*n/|d|^2 \quad (2)$$

where d* represents complex conjugate of d.

As it is seen from Formulas (1) and (2), an estimation value of the frequency transfer function h of the radio channel in the target frequency can be obtained by the processing. Frequency transfer functions of the radio channel calculated by the multiplication processing units 54-1 to 54-M are output to the reception-signal processing units 46.

Figure 9:
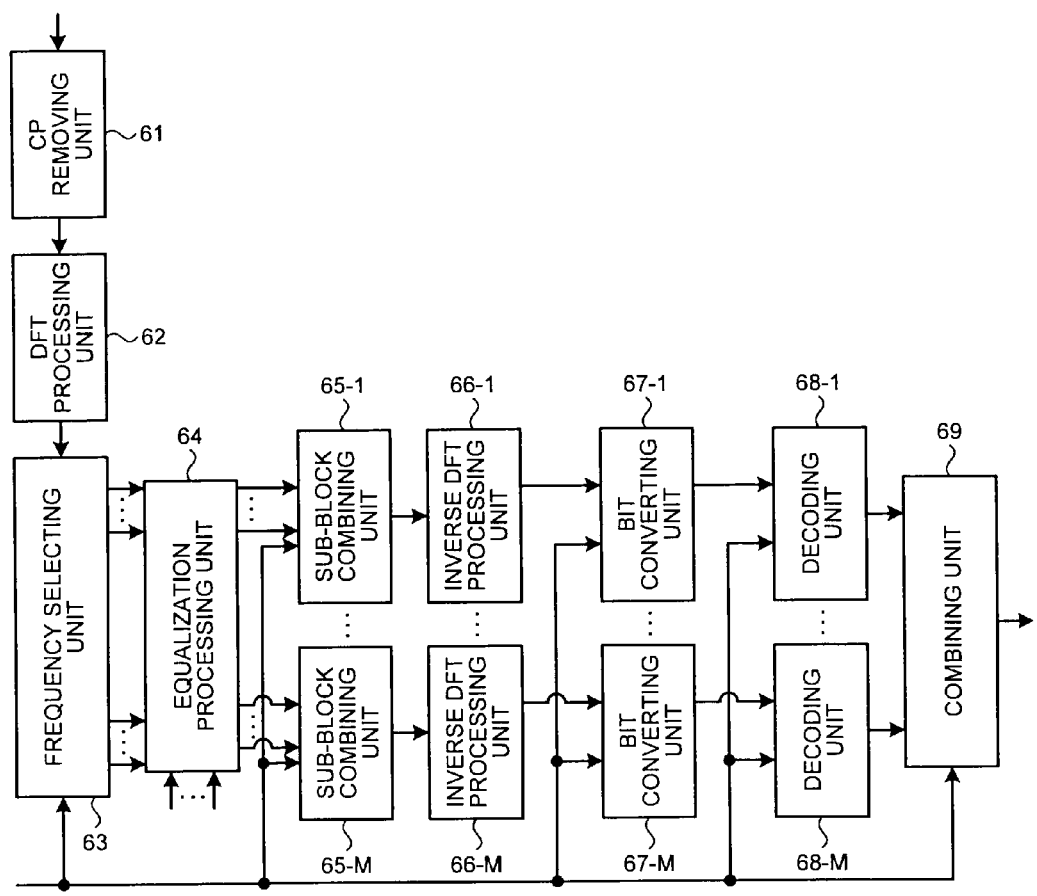
FIG. 9 is a diagram of a configuration example of a reception-signal processing unit.

The operation of the reception-signal processing unit 46 is explained in detail. FIG. 9 is a diagram of a configuration example of the reception-signal processing unit 46. As shown in FIG. 9, the reception-signal processing unit 46 according to this embodiment includes a CP removing unit 61, a DFT processing unit 62, a frequency selecting unit 63, an equalization processing unit 64, sub-block combining units 65-1 to 65-M, inverse DFT processing units 66-1 to 66-M, bit converting units 67-1 to 67-M, decoding units 68-1 to 68-M, an a combining unit 69.

A reception signal sequence input to the reception-signal processing unit 46 are input to the CP removing unit 61. The frequency transfer function of the radio channel as the processing result of the channel-estimation processing unit 45 is input to the equalization processing unit 64. Among the parameters input from the control unit 47, the working frequency information is input to the frequency selecting unit

63, the block division number M is input to the frequency selecting unit 63, the sub-block combining units 65-1 to 65-M, and the combining unit 69. The sub-block division number L for each of the blocks is input to the frequency selecting unit 63 and the sub-block combining units 65-1 to 65-M. The modulation schemes for the respective blocks are input to the bit converting units 67-1 to 67-M, and the encoding methods for the respective blocks are input to the decoding units 68-1 to 68-M.

First, the CP removing unit 61 removes a CP from the top of the reception signal sequence and outputs the reception signal sequence after the CP removal to the DFT processing unit 62. The DFT processing unit 62 executes DFT on the reception signal sequence after the CP removal to calculate frequency components over the entire system band of the reception signal sequence and obtains a reception signal in the frequency domain.

The frequency selecting (extracting) unit 63 extracts, based on the working frequency information, the block division number M, and the sub-block division number L notified from the control unit 47, only signals of frequencies allocated to the sub-blocks by the transmitter from the reception signal in the frequency domain. Then, the frequency selecting unit 63 outputs the extracted reception signals in the frequency domain to the equalization processing unit 64.

The equalization processing unit 64 performs processing for compensating for distortion suffered in the radio channel with respect to the input reception signals in the frequency domain. Specifically, the equalization processing unit 64 performs the processing explained below. A reception signal and a transmission signal in the ith frequency are represented by x and s, respectively. A frequency transfer function of the radio channel in the ith frequency is represented by h. Further, a noise component in the ith frequency is represented by n. In this case, the following Formula (3) holds:

$$x = hs + n \quad (3)$$

When it is assumed that an estimation value of h input from the channel-estimation processing unit 45 is correct, as indicated by the following Formula (4), a transmission signal estimation value in the frequency domain is obtained by multiplying x with complex conjugate of h and dividing the multiplied x by a square value of h.

$$h^* x / |h|^2 = s + h^* n / |h|^2 \quad (4)$$

The transmission signal estimation values in the frequency domain obtained by the processing in Formula (4) are estimation values of sub-blocks in the frequency domain generated by the sub-block generating units 13-1 to 13-M. The equalization processing unit 64 outputs the estimation values of the sub-blocks in the frequency domain to the respective sub-block combining units 65-1 to 65-M.

The sub-block combining units 65-1 to 65-M combine, based on the information concerning the block division number M and the sub-block division number L for each of the blocks notified from the control unit 47, the input estimation values of the sub-blocks in the frequency domain. Thus, the sub-block combining units 65-1 to 65-M obtain estimation values of the blocks in the frequency domain as outputs of the DFT processing units 23 of the sub-block generating units 13-1 to 13-M. The sub-block combining units 65-1 to 65-M output the estimation values of the blocks in the frequency domain to the respective inverse DFT processing units 66-1 to 66-M.

The inverse DFT processing units 66-1 to 66-M execute inverse DFT respectively on the respective input estimation values of the blocks in the frequency domain to thereby obtain estimation values of transmission symbols in the time domain and output the estimation values of the transmission symbols in the time domain to the respective bit converting units 67-1 to 67-M.

The bit converting units 67-1 to 67-M calculate, based on the information concerning the modulation scheme for each of the blocks notified from the control unit 47, estimation values of encoded bit sequences from the input estimation values of the transmission symbols in the time domain and output calculation results to the respective decoding units 68-1 to 68-M. As a method of converting the estimation value of the transmission symbol into the encoded bit sequence, a conventionally-known arbitrary method can be applied. For example, hard decision for comparing the estimation value of the transmission symbol and a signal point arrangement determined by a modulation scheme, determining that a closest signal point is transmitted, and converting the signal point into a corresponding bit can be used. The bit converting units 67-1 to 67-M convert all the input estimation values of the transmission symbols in the time domain into encoded bit sequences and output the encoded bit sequences to the respective decoding units 68-1 to 68-M.

The decoding units 68-1 to 68-M apply, based on the information concerning the encoding methods for the respective blocks notified from the control unit 47, processing of error correction decoding to the input estimation values of the encoded bit sequences and obtain estimation values of information bit sequences of the respective blocks. When the transmitter is executing interleave processing, predetermined inverse interleave processing is applied before error code decoding. The decoding units 68-1 to 68-M output the estimation values of the information bit sequences to the combining unit 69. The combining unit 69 combines the estimation values of the information bit sequences of the M blocks based on the information concerning the block number M notified from the control unit 47 and restores the information bit sequence before being divided into the blocks.

In this way, in this embodiment, the dividing unit 12 of the transmitter divides an information bit sequence into blocks of a plurality of systems and convert each of the blocks into blocks in the frequency domain using the encoding processing, the symbol generation processing, and the DFT processing. The sub-block generating units 13-1 to 13-M further divide each of the blocks in the frequency domain into a plurality of sub-blocks. The frequency allocating unit 14 allocates the sub-blocks to arbitrary frequencies in the entire system bad. Therefore, it is possible to realize high transmission efficiency by applying different encoding and modulation schemes among the blocks in the frequency domain and arranging the blocks in the frequency domain in desired frequencies in the system band. Because the method of generating sub-blocks is configured to divide the block in the frequency domain into a plurality of sub-blocks, it is possible to suppress a PAPR low.

On the other hand, in the receiver, the frequency selecting unit 63 is configured to extract predetermined frequency components out of the entire system band from the reception signal after the DFT processing and extract sub-blocks in the frequency domain. The equalization processing unit 64 applies the equalization processing to the sub-blocks in the frequency domain to correct distortions of the radio channel. Thereafter, the sub-block combining units 65-1 to 65-M combine the sub-blocks in the frequency domain and reproduce the original blocks in the frequency domain. Therefore, as explained above, even when the transmitter performs the processing for further dividing each of plural blocks in the frequency domain generated from an information bit sequence into a plurality of sub-blocks and allocating the sub-blocks to desired frequencies in the entire system band, demodulation and decoding are can be performed.

In this embodiment, the reference-signal generating unit 18 is configured to arrange the known symbol in the frequencies to which the sub-blocks in the frequency domain generated from the information bit sequence through a sequence of processing are allocated. However, the method of generating reference signals is not limited to this. For example, the method of generating reference signals can be a system for accumulating waveforms of reference signals in the time domain and reading out the waveforms. The reference signals and the information bit sequence can be time-multiplexed and transmitted.

The frequencies in which the reference signals are arranged can be set in arbitrary positions. For example, the known symbol can be allocated to predetermined frequencies unrelated to the frequencies to which the sub-blocks in the frequency domain are allocated. Then, the channel-estimation processing unit 45 of the receiver can interpolate a frequency transfer function of frequencies to which the known symbol is not allocated and calculate a frequency transfer function of the frequencies to which the sub-blocks are allocated. Besides, as the structure of the reference signals, all conceivable structures can be applied.

In this embodiment, as illustrated in FIG. 4, the sub-blocks in the frequency domain are allocated to system frequencies in number order. However, a method of allocating the sub-blocks in the frequency domain is not limited to this. For example, sub-blocks in the frequency domain generated from different blocks in the frequency domain can be arranged alternately on a frequency axis. By adopting such a configuration, for example, when the modulation schemes applied to the blocks are different for each block and required quality of a channel (SNR: Signal to Noise Ratio or SINR: Signal to Interference and Noise Ratio, etc.) is not uniform, it is possible to realize a more flexible sub-block arrangement. As a result, it is possible to provide high-quality and large-capacity radio transmission.

When the sub-blocks are allocated to the frequency axis, it is also possible to arrange a plurality of sub-blocks generated from the same block in positions apart from one another on the frequency axis. A correlation of the radio channel is smaller as frequencies are farther apart from one another. Therefore, it is possible to obtain an effect of frequency diversity and, as a result, realize high-quality transmission by allocating the sub-blocks generated from the same block to positions apart from one another on the frequency axis.

The sub-blocks in the frequency domain do not always need to be arranged apart from one another on the frequency axis and can be allocated to frequencies adjacent to one another. When such a configuration is adopted, for example, it is possible to concentratedly allocate the sub-blocks to frequencies with high communication quality (high SNR or SINR) and provide high-quality radio transmission.

The encoding methods, the modulation schemes, and the sub-block division number applied to the blocks do not need to be the same for the each block and can be arbitrarily set for each of the blocks. When the dividing unit 12 shown in FIG. 2 divides the information bit sequence into a plurality of blocks, the number of information bits included in the each block does not need to be equal among the blocks. Further, the sizes of the sub-blocks in the block can be respectively set to different values. By adopting such a configuration, it is possible to form sub-blocks having various sizes, required SNRs, required SINRs, or the like. Flexibility in allocating the sub-blocks to the frequencies is improved. As a result, it is possible to provide high-quality and large-capacity radio transmission.

In this embodiment, it is assumed that the system band is continuous. However, the system band does not always need to be continuous. The present invention can also be applied, without any problem, to a system including a plurality of sub-system bands present on the frequency axis apart from one another.

In this embodiment, the operations of the transmitter and the receiver are determined based on the parameters notified from the control unit 11 and the control unit 47, respectively. In this case, the parameters notified from the control unit 11 and the control unit 47 do not need to be fixed while communication is performed and can be freely changed within a range of operation forms supported by the system. For example, in the case of a state in which the SNR or the SINR is high across relatively wide continuously frequencies in the system band, the control unit 11 and the control unit 47 operate to continuously allocate the sub-blocks to the frequencies. In a state in which frequencies with the high SNR or SINR are discretely present in the system band and values of the SNR or the SINR in the frequency bands are the same degree, M=1 and L is set to be equal to or larger than 2.

When strict frequency selectivity fading is present and fluctuation on the frequency axis of the frequency transfer function is large, M is set to a large value and the modulation schemes and the encoding methods applied to the blocks are finely set to conform to a frequency characteristic of the radio channel. By performing such control, it is possible to realize both large-capacity transmission and PAPR suppression in the transmitter. It goes without saying that there is no limit in ranges of M and L and the control unit 11 and the control unit 47 can change the parameters in an arbitrary combination.

When the parameters used by the transmitter and the receiver are changed in this way, the control unit 11 of the transmitter and the control unit 47 of the receiver need to set the same parameters. As a method for setting the same parameters, it is possible to apply an arbitrary system. For example, it is possible to adopt a method in which, before the transmitter transmits a signal to the receiver, the receiver measures a state of the radio channel based on a known signal transmitted from the transmitter and notifies the transmitter of desired parameters. Furthermore, it is possible to adopt a method of determining a combination of parameters and order of use of the parameters in advance and changing the parameters according to the order. As another realizing method, a configuration is also conceivable in which a dedicated signal for notifying parameters from the transmitter to the receiver is multiplexed in a frame, parameters used in the frame are notified to the receiver using the dedicated signal, and the control unit 47 of the receiver reads the dedicated signal for parameter notification to set the parameters.

In this embodiment, the inverse DFT processing unit 15 of the transmitter generates signals of the time domain covering the entire system band. However, the transmitter can include a plurality of inverse DFT processing units each of which is corresponding to frequency width smaller than the system band, and allocate signals in the time domain to predetermined frequencies in the system band. In this case, it is possible to reduce a processing amount for the inverse DFT processing. Such a configuration is suitable when the system band includes a plurality of sub-system bands present apart from one another on the frequency axis. For example, each of the inverse DFT processing units can be set to correspond to the each of sub-system bands.

In this embodiment, each of the transmitter and the receiver includes one antenna. Alternatively, the transmitter can simultaneously transmit, using a plurality of transmission antennas, radio transmission signals generated by the present invention. The receiver can receive signals using a plurality of reception antennas. When the transmitter transmits the radio transmission signals using the transmission antennas, the receiver needs to separate the transmitted respective signals for each of the transmission antennas. This can be attained by applying a publicly-known signal separation algorithm disclosed in, for example, "Xu Zhu and Ross D. Murch, "Novel Frequency-Domain Equalization Architectures for a Single-Carrier Wireless MIMO System", IEEE VTC2002-Fall, pp. 874-878" to the equalization processing unit. When a plurality of antennas are used in the transmitter and the receiver, it is also possible to combine various algorithms, which can be applied to a system that performs transmission and reception of signals using a plurality of antennas, such as STBC (Space-Time Block Code), SFBC (Space-Frequency Block Code), and beam forming.

The configuration of the transmitter is not limited to the configuration of this embodiment as long as the transmitter can divide a transmission sequence formed as blocks into sub-blocks and transmit signals same as those explained above. The configuration of the receiver can be any configuration as long as the receiver can decode signals formed as sub-blocks and transmitted.

Second Embodiment

Figure 10:
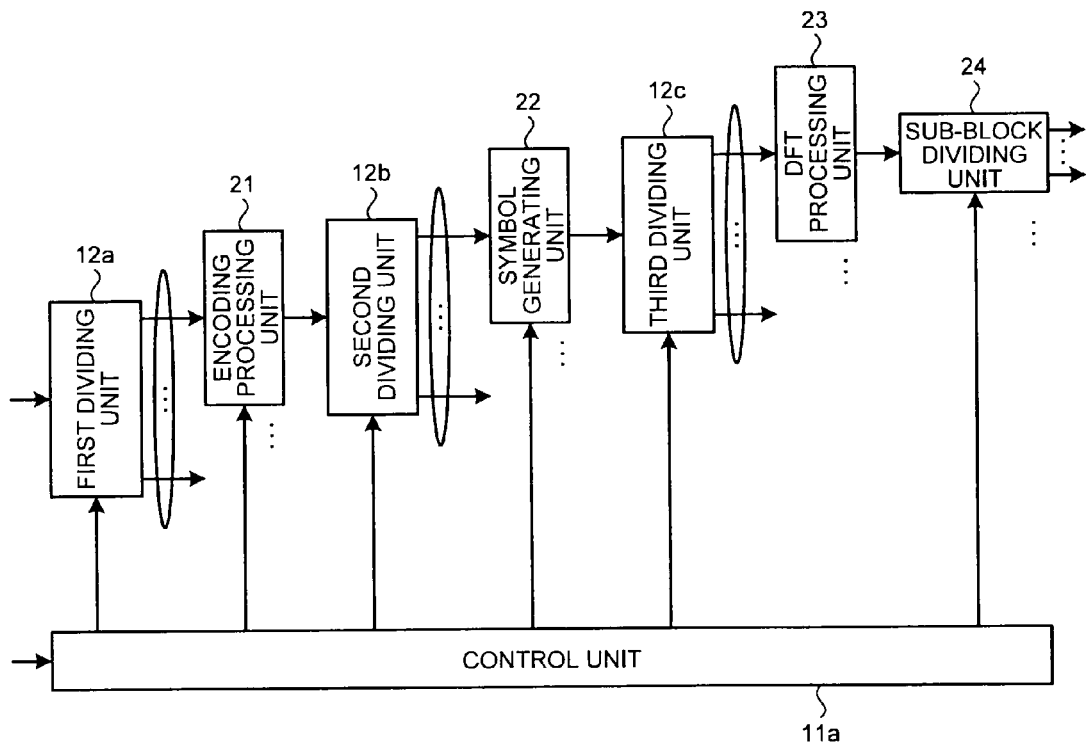
FIG. 10 is a diagram of a configuration example of components related to sub-block generation of a transmitter according to a second embodiment.

FIG. 10 is a diagram of a configuration example of components related to sub-block generation of a transmitter according to a second embodiment of the present invention. The configuration of the transmitter according to this embodiment includes a control unit 11a instead of the control unit 11 and includes a first dividing unit 12a, a second dividing unit 12b, and a third dividing unit 12c instead of the dividing unit 12 and the sub-block generating units 13-1 to 13-M. Otherwise, the transmitter according to the second embodiment is the same as the transmitter according to the first embodiment. However, although functions of the encoding processing unit 21, the symbol generating unit 22, and the DFT processing unit 23 are the same as those in the first embodiment, the numbers of the components are different from those in the first embodiment as explained later. Components having functions same as those in the first embodiment are denoted by the same reference numerals and signs and explanation of the components is omitted. Differences from the first embodiment are explained below.

The transmitter according to this embodiment is mainly different from the transmitter according to the first embodiment in that block division can be performed in arbitrary positions (processing stages) of signal generation processing. In the example shown in FIG. 10, the first dividing unit 12a divides, based on notification from the control unit 11a, a transmitted information bit sequence into A information bit blocks and outputs the information bit blocks to the encoding processing units 21 corresponding thereto. In FIG. 10, only components concerning a first block are representatively shown. However, concerning the A blocks, the transmitter includes the respective encoding processing units 21 and the respective second dividing units 12b. In other words, the transmitter includes A encoding processing units 21 and A second dividing units 12b. The encoding processing unit 21 executes error correction encoding on information bits in the information bit block to generate an encoded bit sequence, and outputs the encoded bit sequence to the second dividing unit 12b.

Each of the second dividing unit 12b divides, based on notification from the control unit 11a, the input encoded bit sequence into encoded bit blocks, and outputs the encoded bit blocks to the respective symbol generating units 22. It is assumed that a total number of encoded bit blocks output from the A second dividing units 12b is B. In FIG. 10, only components concerning a first block are representatively shown. However, concerning the B blocks, the transmitter includes the respective symbol generating units 22 and the respective third dividing units 12c. In other words, the transmitter includes B symbol generating units 22 and B third dividing units 12c. The symbol generating unit 22 converts encoded bits in the encoded bit block into a symbol sequence, and outputs the symbol sequence to the third dividing unit 12c.

The third dividing unit 12c divides, based on notification from the control unit 11a, the input symbol sequence into symbol blocks and outputs the symbol blocks to the DFT processing unit 23. It is assumed that the total number of encoded bit blocks output from the B third dividing unit 12c is C. In FIG. 10, only components concerning a first block are representatively shown. However, concerning the C blocks, the transmitter includes respective C DFT processing units 23 and respective C sub-block dividing units 24. The DFT processing unit 23 executes DFT on the symbol block to generate a block in the frequency domain and outputs the block in the frequency domain to the sub-block dividing unit 24. The sub-block dividing unit 24 divides the block in the frequency domain into a plurality of sub-blocks in the frequency domain and outputs the sub-blocks to the frequency allocating unit 14. The following processing is the same as that in the first embodiment.

Figure 11:
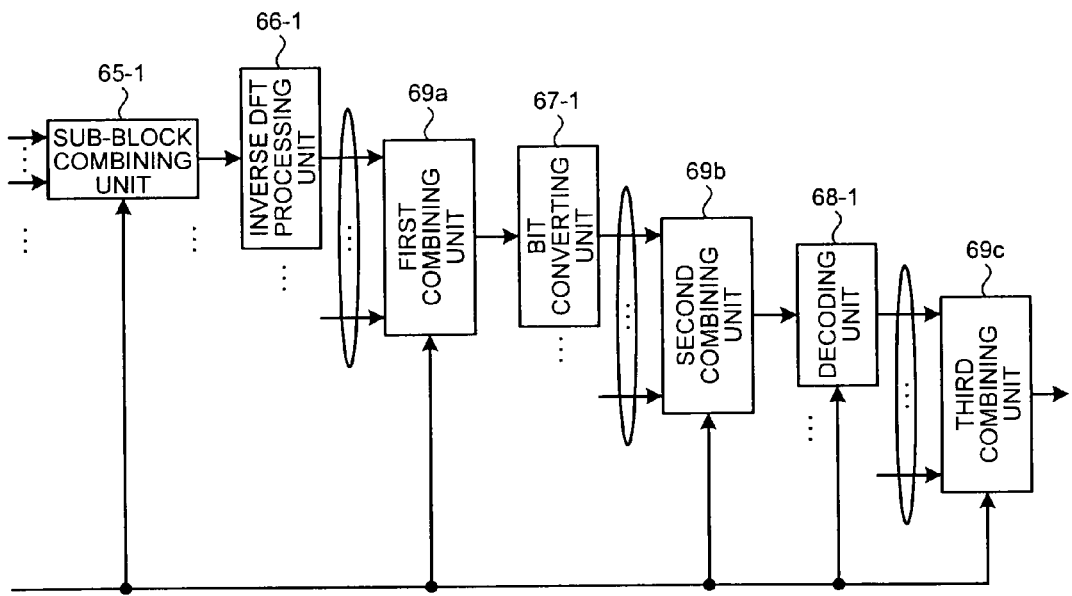
FIG. 11 is a diagram of a configuration example of components related to combining processing of a reception-signal processing unit of a receiver according to the second embodiment.

The configuration and the operation of a receiver according to this embodiment are explained below. Differences from the first embodiment are explained. FIG. 11 is a diagram of a configuration example of components related to combining processing of a reception-signal processing unit of the receiver according to this embodiment. The reception-signal processing unit of the receiver according to this embodiment includes a first combining unit 69a, a second combining unit 69b, and a third combining unit 69c instead of the combining unit 69 of the reception-signal processing unit 46 according to the first embodiment. Otherwise, the reception-signal processing unit is the same as the reception-signal processing unit 46 according to the embodiment. In FIG. 11, the CP removing unit 61, the DFT processing unit 62, the frequency selecting unit 63, and the equalization processing unit 64 are omitted. However, in this embodiment, the receiver includes these components as in the first embodiment.

In this embodiment, one set of the sub-block combining unit 65-1 and the inverse DFT processing unit 66-1 is shown. However, the receiver includes C sub-block combining units 65-1 to 65-C and C inverse DFT processing units 66-1 to 66-C. In this embodiment, the bit converting units 67-1 to 67-b are arranged between the first combining unit 69a and the second combining unit 69b and the decoding units 68-1 to 68-A are arranged between the second combining unit 69b and the third combining unit 69c. In FIG. 11, for simplification, only the bit converting unit 67-1 and the decoding unit 68-1 are shown.

Concerning the operation of the reception-signal processing unit of the receiver according to this embodiment, differences from the first embodiment are explained. As in the first embodiment, each of the sub-block combining units 65-1 to 65-C combines, based on information of the sub-block division number notified from the control unit 47, estimation values of respective sub-blocks in the frequency domain input from the equalization processing unit 64 and generates estimation values of a block in the frequency domain. The sub-block combining units 65-1 to 65-C output the estimation values of the blocks in the frequency domain to the respective inverse DFT processing units 66-1 to 66-C.

Each of the inverse DFT processing units 66-1 to 66-C executes inverse DFT on the estimation value of the block in the frequency domain to obtain an estimation value of a symbol block, and outputs the estimation value of the symbol block to the first combining unit 69a.

The first combining unit 69a combines the estimation values of the C symbol blocks based on block division information (information containing the block division numbers A, B, and C) notified from the control unit 47, generates estimation values of symbol sequences, and outputs the estimation values of the symbol sequences to the bit converting units 67-1 to 67-B, respectively.

Each of the bit converting units 67-1 to 67-B converts, based on the information concerning the modulation scheme notified from the control unit 47, estimation values of symbols included in the input estimation value of the symbol sequence into estimation values in bit unit to generate an estimation value of the encoded bit block. The bit converting units 67-1 to 67-B output the respective estimation values of the encoded bit blocks to the second combining unit 69b.

The second combining unit 69b combines the estimation values of the B encoded bit blocks based on the block division information notified from the control unit 47, and generates estimation values of the encoded bit sequences. The second combining unit 69b outputs the estimation values of the encoded bit sequences to the respective decoding units 68-1 to 68-A.

Each of the decoding units 68-1 to 68-A applies, based on the information concerning the encoding method notified from the control unit 47, processing of an error correction signal to each of the input encoded bit sequences and obtain an estimation value of a information bit block. When interleave processing is performed in the transmitter, the inverse interleave equivalent to opposite processing is also performed. The decoding units 68-1 to 68-A output the respective estimation values of the information bit blocks to the third combining unit 69c.

The third combining unit 69c combines estimation values of the A information bit blocks based on the block division number A notified from the control unit 47 and obtains an estimation value of the information bit sequence before the division. Except the above, the operation in this embodiment is the same as that in the first embodiment.

By adopting such a configuration, for example, A=M, B=1, and C=1, it is possible to divide the information bit sequence to be transmitted before encoding into blocks as in the first embodiment. If A=1, B=M, and C=1, it is possible to divide the encoded bit sequence after the encoding processing into blocks. If A=1, B=1, and C=M, it is possible to divide the symbol sequence into blocks.

In the example, it is a premise to perform division in any one of the first dividing unit 12a, the second dividing unit 12b, and the third dividing unit 12c (any one of A, B, and C is equal to or larger than 2 and the other two are 1). However, division can be performed in two or more of the first dividing unit 12a, the second dividing unit 12b, and the third dividing unit 12c. For example, it is also possible that A is set to be equal to or larger than 2, the first dividing unit 12a divides the information bit sequence into A blocks, B is set to be equal to or larger than 2, and the second dividing unit 12b divides the divided blocks into B blocks.

As explained above, in this embodiment, positions where the transmitter performs block division can be arranged in arbitrary stages of the transmission signal processing. In the receiver according to this embodiment, the combining units are arranged in the respective stages of the reception signal processing to make it possible to combine blocks divided by the transmitter according to this embodiment and restore an original signal sequence. Therefore, it is possible to finely determine a required SNR or a required SINR with respect to sub-blocks according to the size of the blocks and a combination of applied encoding method and modulation scheme. It is possible to provide high-quality and large-capacity communication suited to a channel state. It is possible to obtain a circuit for generating sub-blocks in the frequency domain with a configuration simpler than individually preparing the circuit for each of the sub-blocks.

Third Embodiment

Figure 12:
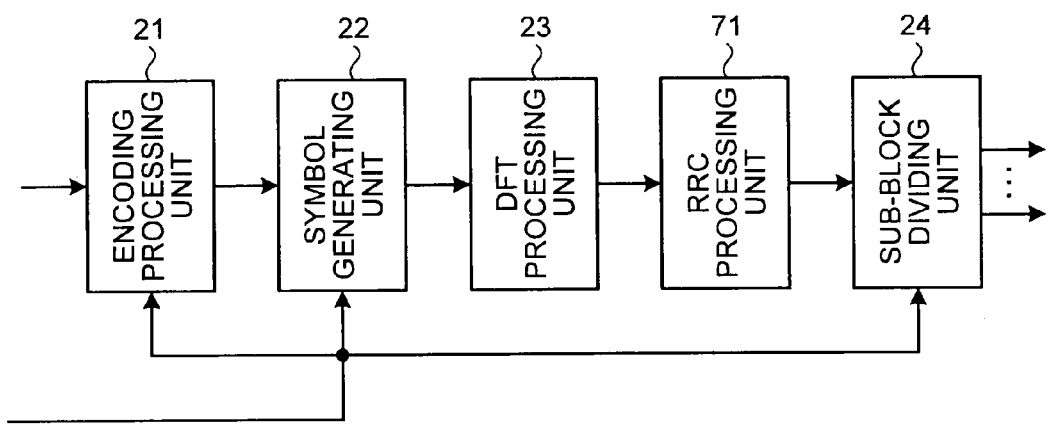
FIG. 12 is a diagram of a functional configuration example of a sub-block generating unit of a transmitter according to a third embodiment.

FIG. 12 is a diagram of a functional configuration example of a third embodiment of the sub-block generating unit of the transmitter according to the present invention. The transmitter according to this embodiment is the same as the transmitter according to the first embodiment except that the sub-block generating units 13-1 to 13-M according to the first embodiment are respectively replaced with sub-block generating units according to this embodiment. As shown in FIG. 12, the sub-block generating units according to this embodiment are the same as the respective sub-block generating units 13-1 to 13-M according to the first embodiment except that RRC (Root Raised Cosine) processing units 71 are added to the sub-block generating units 13-1 to 13-M according to the first embodiment shown in FIG. 3. In this embodiment, as in the first embodiment, the transmitter includes M sub-block generating units. The sub-block generating units apply processing, respectively, to M blocks output from the dividing unit 12. Components having functions same as those in the first embodiment are denoted by reference numerals and signs same as those in the first embodiment and explanation of the components is omitted. Differences from the first embodiment are explained below.

In this embodiment, the transmitter applies filtering processing (RRC processing) for the frequency domain to an output of the DFT processing unit 23 and then passes the output to a sub-block dividing unit. The receiver applies the filtering processing for the frequency domain to a result obtained by combining sub-blocks and then outputs the result to the inverse DFT processing units 66-1 to 66-M.

First, the operation of the transmitter according to this embodiment is explained. In this embodiment, as explained above, the configuration of the sub-block generating unit is different from that in the first embodiment. Besides, in this embodiment, content of working frequency information passed by the control unit 11 shown in FIG. 2 to the frequency allocating unit 14 and the reference-signal generating unit 18 is different from that in the first embodiment. In this embodiment, the control unit 11 performs processing for expanding the size of a block in the frequency domain (cyclic expansion processing) as explained later. Therefore, the control unit 11 notifies the frequency allocating unit 14 and the reference-signal generating unit 18 of expanded block size of the frequency domain as working frequency information.

Processing of sub-blocks in this embodiment is explained below. Processing of the encoding processing unit 21, the symbol generating unit 22, and the DFT processing unit 23 is the same as that in the first embodiment. The DFT processing unit outputs a block in the frequency domain to the RRC processing unit 71.

The RRC processing unit 71 applies cyclic expansion processing explained later to an input block in the frequency domain, executes filtering by an RRC (Root Raised Cosine) filter, and executes shaping of a signal component in the frequency domain.

Figure 13:
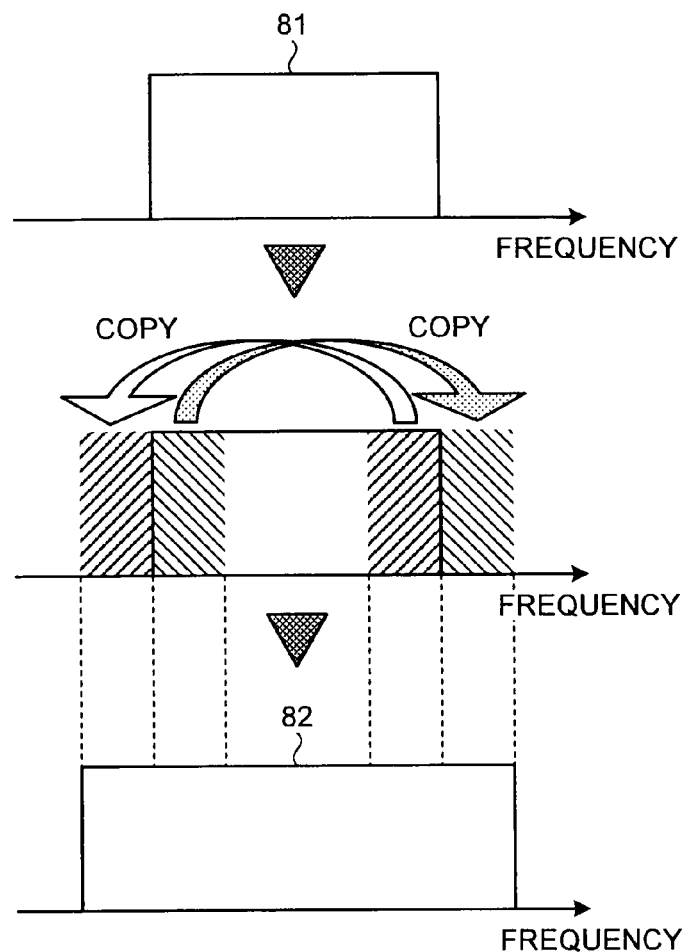
FIG. 13 is a diagram of an example of cyclic expansion processing for a block in the frequency domain.

FIG. 13 is a diagram of an example of the cyclic expansion processing to a block in the frequency domain. In FIG. 13, a block 81 indicates a block in the frequency domain input from the DFT processing unit 23. A block 82 indicates the block in the frequency domain after the cyclic expansion processing. Specifically, the cyclic expansion processing is processing of copying data having predetermined frequency width respectively from the top and the tail end of the block 81 in the frequency domain, adding the data copied from the top of the block 81 in the frequency domain to the end of the block 81 in the frequency domain, and adding the data copied from the tail end of the block 81 in the frequency domain to the front of the block 81 in the frequency domain. As a result, as indicated by the block 82 shown in FIG. 13, a block with the size expanded on a frequency axis with respect to the block 81 is generated.

The frequency width expanded by the cyclic expansion processing depends on a roll-off ratio of the RRC filter. For example, when the roll-off ratio is 10%, data equivalent to 5% of frequency bandwidth occupied by a block in the frequency domain is respectively added to the top and the tail end of the block in the frequency domain by the cyclic expansion processing. As a result, the occupied bandwidth is expanded 10%.

Figure 14:
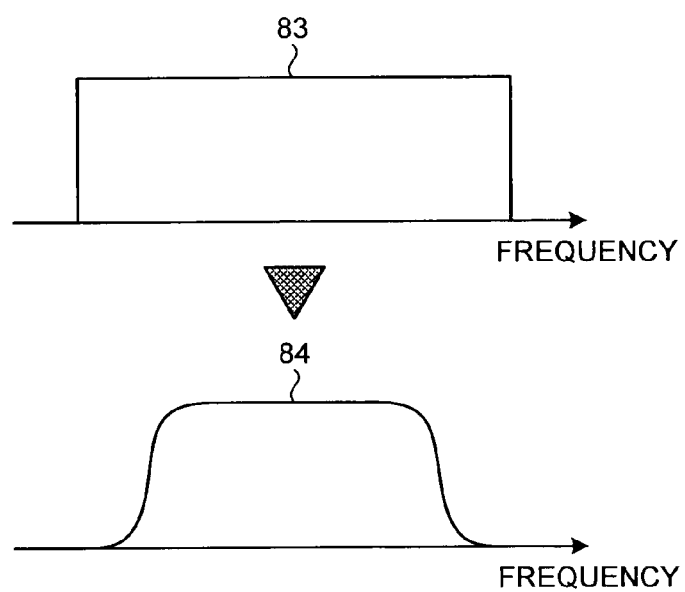
FIG. 14 is a diagram of an example of shaping processing for a signal component in the frequency domain.

FIG. 14 is a diagram of an example of shaping processing for a signal component in the frequency domain. In FIG. 14, a block 83 indicates a block in the frequency domain after the cyclic expansion processing. A block 84 indicates the block in the frequency domain after the filtering by the RRC filter. A filter coefficient calculating method of the RRC filter is well-known by those skilled in the art. For example, the method disclosed in John Proakis, "Digital Communications" McGraw-Hill can be applied. The filtering coefficient calculating method of the RRC filter is not limited to this. Any method used in general can be used.

The RRC processing unit 71 outputs a block, to which shaping of a signal component in the frequency domain is carried out by the RRC processing, to the sub-block dividing unit 24. The shaping processing for the signal component can be carried out using other filters instead of the RRC filter.

The sub-block dividing unit 24 applies division processing same as that in the first embodiment to a block input from the RRC processing unit 71. Specifically, the sub-block dividing unit 24 divides, based on the sub-block division number L notified from the control unit 11, an input block in the frequency domain into L sub-blocks. The sub-block dividing unit 24 outputs the L sub-blocks after the division to the frequency allocating unit 14 shown in FIG. 2 in the same manner as the first embodiment. Thereafter, after performing processing same as that in the first embodiment, the sub-blocks are transmitted from the transmission antenna 4 shown in FIG. 1.

Figure 15:
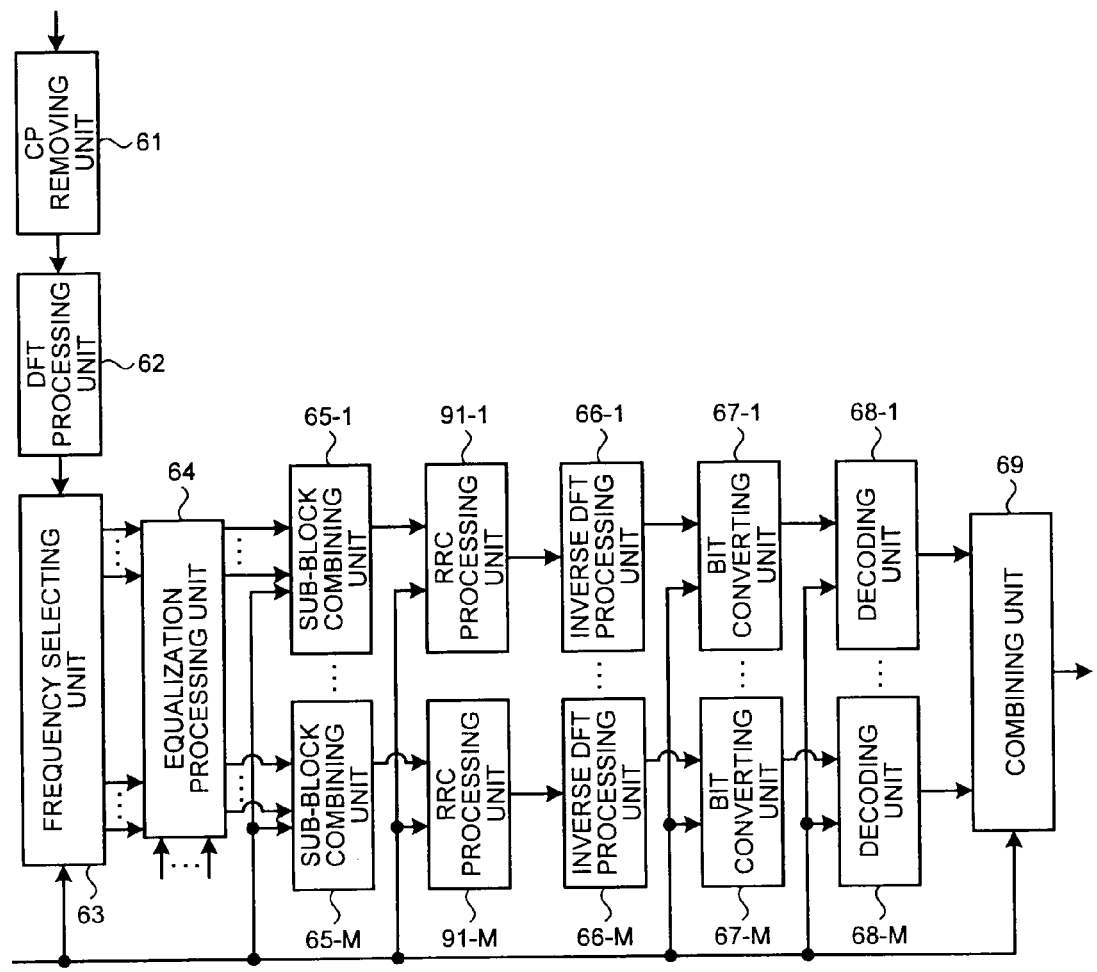
FIG. 15 is a diagram of a functional configuration example of a reception-signal processing unit of a receiver according to the third embodiment.

The operation of the receiver according to this embodiment is explained below. FIG. 15 is a diagram of a functional configuration example of a reception-signal processing unit of the receiver according to this embodiment. The receiver according to this embodiment is the same as the receiver according to the first embodiment except that the reception-signal processing unit 46 of the receiver according to the first embodiment is replaced with the reception-signal processing unit according to this embodiment.

As shown in FIG. 15, the reception-signal processing unit according to this embodiment is the same as the reception-signal processing unit 46 according to the first embodiment in the first embodiment except that RRC processing units 91-1 to 91-M are added to the reception-signal processing unit 46. Components having functions same as those in the first embodiment are denoted by reference numerals and signs same as those in the first embodiment and explanation of the components is omitted. Differences from the first embodiment are explained below.

The receiver according to this embodiment is different from the receiver according to the first embodiment in that the configuration of the reception-signal processing unit is different as explained above and that the control unit 47 shown in FIG. 7 passes working frequency information, which takes into account expansion of a working frequency by the cyclic expansion processing of the block in the frequency domain performed by the transmitter, to the channel-estimation processing unit 45 and the frequency selecting unit 63 of the reception-signal processing unit.

Processing up to processing by the sub-block combining units 65-1 to 65-M of the reception-signal processing unit according to this embodiment is the same as that in the first embodiment. The sub-block combining units 65-1 to 65-M calculate estimation values of blocks in the frequency domain in the same manner as the first embodiment and output the calculated estimation values of the blocks in the frequency domain to the respective RRC processing units 91-1 to 91-M.

Each of the RRC processing units 91-1 to 91-M multiplies each of the input estimation values of the blocks in the frequency domain with an RRC filter having a filter coefficient same as the RRC filter applied in the transmitter, extracts only frequency components equivalent to the block in the frequency domain before the cyclic expansion processing from a multiplication result. Then, the RRC processing units 91-1 to 91-M pass the extracted results to the inverse DFT processing units 66-1 to 66-M, respectively. Thereafter, processing same as that of the receiver according to the first embodiment is performed and finally an information bit sequence is restored. Operations in this embodiment except those explained above are the same as those in the first embodiment.

In this way, in this embodiment, the transmitter performs the sub-block division after applying the filter processing to a processing result of the DFT processing unit 23. Therefore, it is possible to improve a PAPR suppression effect in the transmitter compared with the first embodiment.

In this embodiment, the control unit 11 notifies, as a working frequency, expanded block size in the frequency domain taking into account the cyclic expansion processing in the RRC processing unit 71. The configuration of notifying the working frequency is not limited to this. For example, the working frequency can be notified in the same manner as the first embodiment and the control unit 11 can separately notify a bandwidth expanded by the cyclic expansion processing. For example, the RRC processing unit 71 or the control unit 11 can notify the sub-block dividing unit 24 in the latter stage of a roll-off ratio of the RRC filter used by the RRC processing unit 71. Then, the sub-block dividing unit 24 can calculate, based on the roll-off ratio and working frequency information, bandwidth expanded by the cyclic expansion processing every time.

Concerning reception processing, instead of notifying the expanded block size in the frequency domain taking into account the cyclic expansion processing as the working frequency, the control unit 47 can notify the working frequency before the expansion in the same manner as the first embodiment. The RRC processing units 91-1 to 91-M or the control unit 47 can notify the sub-block combining units 65-1 to 65-M of the bandwidth expanded by the cyclic expansion processing.

As the filter coefficient of the RRC filter, a fixed value determined between the transmitter and the receiver in advance can be used. Alternatively, the filter coefficient can be changed as appropriate. For example, when the transmitter determines based on a characteristic of transmission data, environment, or the like that it is desired to suppress a PAPR as much as possible, the transmitter can transmit a signal for requesting to increase the roll-off ratio to the receiver and, when the receiver receives the request signal, the receiver can notify the transmitter of a specific roll-off ratio used in the next transmission.

Control opposite to the above is also possible. For example, when the transmitter determines that PAPR suppression is not very necessary, the transmitter can transmit a signal for requesting to reduce the roll-off ratio to the receiver and the receiver can notify the transmitter of an appropriate roll-off ratio.

Filter coefficients can be different among transmitters. Types or the like of filters in use can be different among the transmitters as long as information concerning the filters can be shared between the transmitters and receivers. A transmitter that performs transmission using a filter and a transmitter that performs transmission without using a filter can be mixed in the same system.

In this embodiment, the filter processing is performed between the DFT processing unit 23 and the sub-block dividing unit 24. However, the filter processing is not limited to this. The filter processing can be performed between the symbol generating unit 22 and the DFT processing unit 23. In this case, the filter processing is performed on a time domain signal. Therefore, the filter processing can be realized by convolution of the filter coefficient and a transmission symbol sequence. In this case, the RRC filter can also be used as an example of a filter.

In this embodiment, the same RRC processing units are respectively provided with respect to the M sub-block generating units (the sub-block generating units 13-1 to 13-M). However, filter processing can be adaptively changed for each of the sub-block generating units. For example, it is also possible to apply the RRC filter only when the number of sub-block divisions in the frequency domain divided by the sub-block dividing unit is equal to or larger than two and not to apply the filter processing when the number of sub-block divisions is one.

As another example, the RRC filter can be applied only when the size of sub-blocks in the frequency domain is larger than frequency bandwidth determined in advance. When the sub-block generating units adaptively perform setting of whether the filter processing is applied or not and setting of the filter coefficient in this way, it is possible to obtain a desired PAPR suppression effect while keeping bandwidth expansion by the cyclic expansion processing to a minimum.

In this embodiment, the RRC processing unit 71 can be added between the DFT processing unit 23 and the sub-block dividing unit 24 of the transmitter according to the first embodiment to carry out the filter processing in the same manner as this embodiment. In that case, the RRC processing units 91-1 to 91-C are added between the sub-block combining units 65-1 to 65-C and the inverse DFT processing units 66-1 to 66-C of the receiver according to the second embodiment.

Fourth Embodiment

Figure 16:
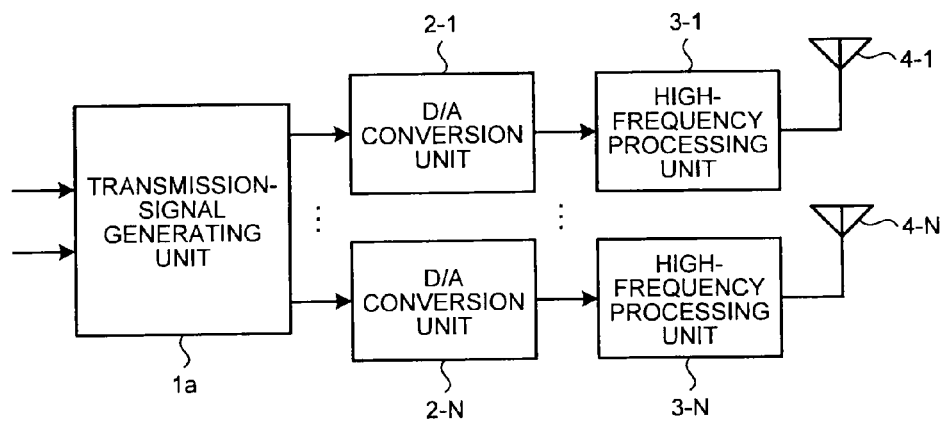
FIG. 16 is a diagram of a functional configuration example of a transmitter according to a fourth embodiment.

FIG. 16 is a diagram of a functional configuration example of a transmitter according to a fourth embodiment of the present invention. The transmitter according to this embodiment includes a transmission-signal generating unit 1a, D/A conversion units 2-1 to 2-N (N is the number of transmission antennas and is an integer equal to or larger than 2) each having a function same as that of the D/A conversion unit 2 according to the first embodiment, high-frequency processing units 3-1 to 3-N each having a function same as that of the high-frequency processing unit 3 according to the first embodiment, and transmission antennas 4-1 to 4-N.

In this embodiment, when the transmitter is configured to be capable of transmitting signals using a plurality of antennas, a bock dividing method can be set for each of the transmission antennas. In the transmitter according to this embodiment, as shown in FIG. 16, the transmission-signal generating unit 1a passes N transmission signals for the respective transmission antennas to the respective D/A conversion units 2-1 to 2-N. The transmitter is configured to be capable of finally transmitting signals from N transmission antennas. Differences from the first embodiment are explained below.

Figure 17:
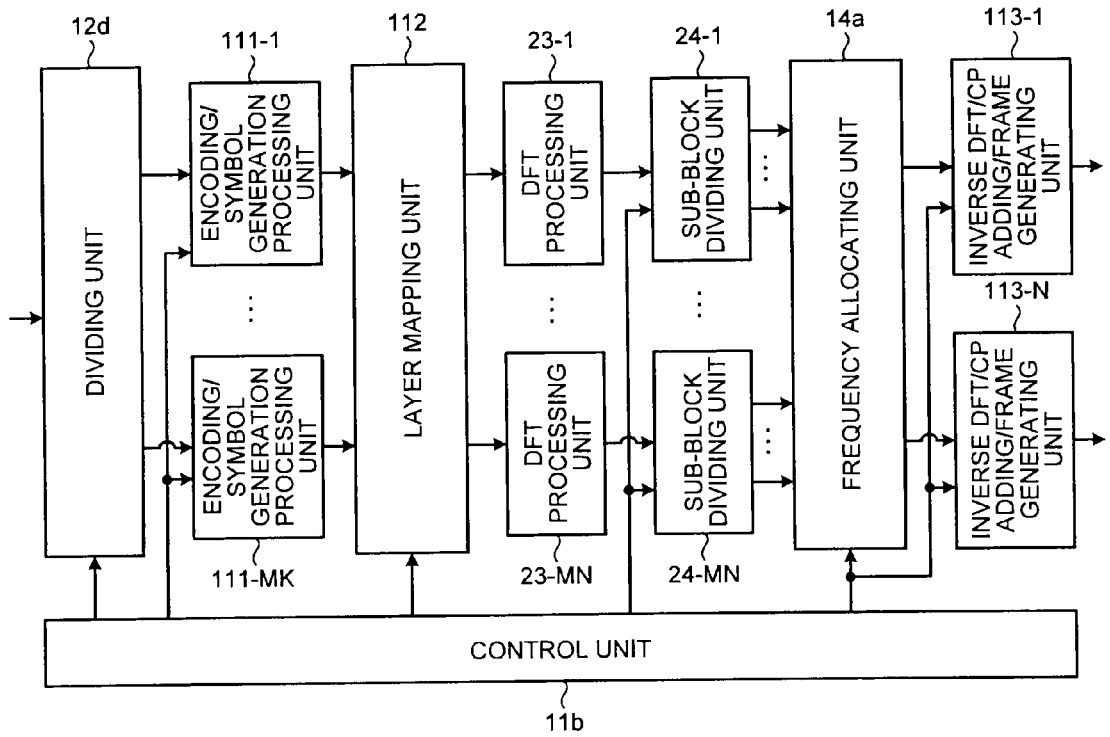
FIG. 17 is a diagram of a configuration example of a transmission-signal generating unit according to the fourth embodiment.

FIG. 17 is a diagram of a configuration example of the transmission-signal generating unit 1a. As shown in FIG. 17, the transmission-signal generating unit 1a according to this embodiment includes a control unit 11b, a dividing unit 12d, encoding/symbol generation processing units 111-1 to 111-MK (MK=M×K: K=1, 2, . . . , N), a layer mapping unit 112, DFT processing units 23-1 to 23-MN (MN=M×N), sub-block dividing units 24-1 to 24-MN, a frequency allocating unit 14a, and inverse DFT/CP adding/frame generating units 113-1 to 113-N. K is an integer in a range of 1 to N and represents the number of independent blocks simultaneously transmitted using a plurality of transmission antennas. When the number of transmission antennas is N, it is possible to transmit blocks maximum N times as many as those transmitted when the number of transmission antennas is one. K is hereinafter referred to as the number of code word.

The operation of the transmitter according to this embodiment is explained below. First, the control unit 11b creates parameters output to components of the transmission-signal generating unit 1a. Specifically, in the example shown in FIG. 17, the control unit 11b determines the division number M used by the dividing unit 12d to divide an information bit sequence into blocks and notifies the dividing unit 12d of the division number M. Further, the control unit 11b also notifies the dividing unit 12d of the number of code word K. The control unit 11b notifies the encoding/symbol generation processing units 111-1 to 111-MK of encoding methods and modulation schemes used by the respective blocks. Further, the control unit 11b notifies the layer mapping unit 112 of a method of allocating the blocks to the transmission antennas (hereinafter referred to as layer mapping information). Further, the control unit 11b notifies the sub-block dividing units 24-1 to 24-N of the sub-block division number L in the frequency domain and notifies the frequency allocating unit 14a and the inverse DFT/CP adding/frame generating units 113-1 to 113-N of working frequency information with respect to the transmission antennas.

Figure 18:
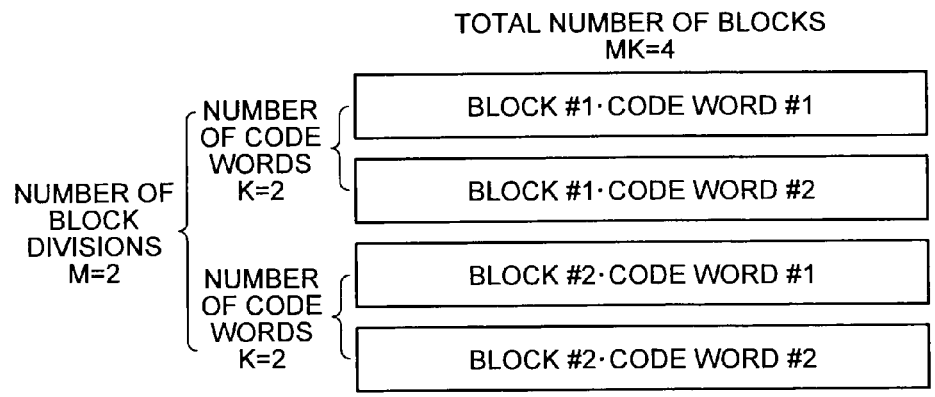
FIG. 18 is a diagram of an example of division of an information bit sequence carried out by a dividing unit according to the fourth embodiment.

The dividing unit 12d divides an information bit sequence into MN blocks based on the number of code word K and the block division number M. FIG. 18 is a diagram of an example of the division of the information bit sequence carried out by the dividing unit 12d. In the example shown in FIG. 18, the block division number M=2 and the number of code word K=2. The information bit sequence is divided into MK, i.e., four blocks. In FIG. 18, for convenience of explanation, groups of the information bit sequence divided according to the block division number M=2 are represented as block #1 and block #2. Groups of the information bit sequence divided according to the number of code word K=2 are represented as code word #1 and code word #2.

The dividing unit 12*d* outputs the divided MK blocks to the respective encoding/symbol generation processing units 111-1 to 111-MK. Each of the encoding/symbol generation processing units 111-1 to 111-MK respectively performs processing same as the encoding processing unit 21 and the symbol generating unit 22 of the transmitter according to the first embodiment, and outputs a processing result to the layer mapping unit 112.

The layer mapping unit 112 allocates, based on layer mapping information notified from the control unit 11*b*, the MK blocks input from the encoding/symbol generation processing units 111-1 to 111-MK to the transmission antennas. The layer mapping unit 112 performs processing for converting the input MK blocks (the blocks divided based on the block division number M and the number of code word K) into blocks based on the block division number M and the number of layer N. In other words, the layer mapping unit 112 performs conversion of blocks such that the MK blocks are converted into MN blocks (blocks in layer unit).

Figure 19:
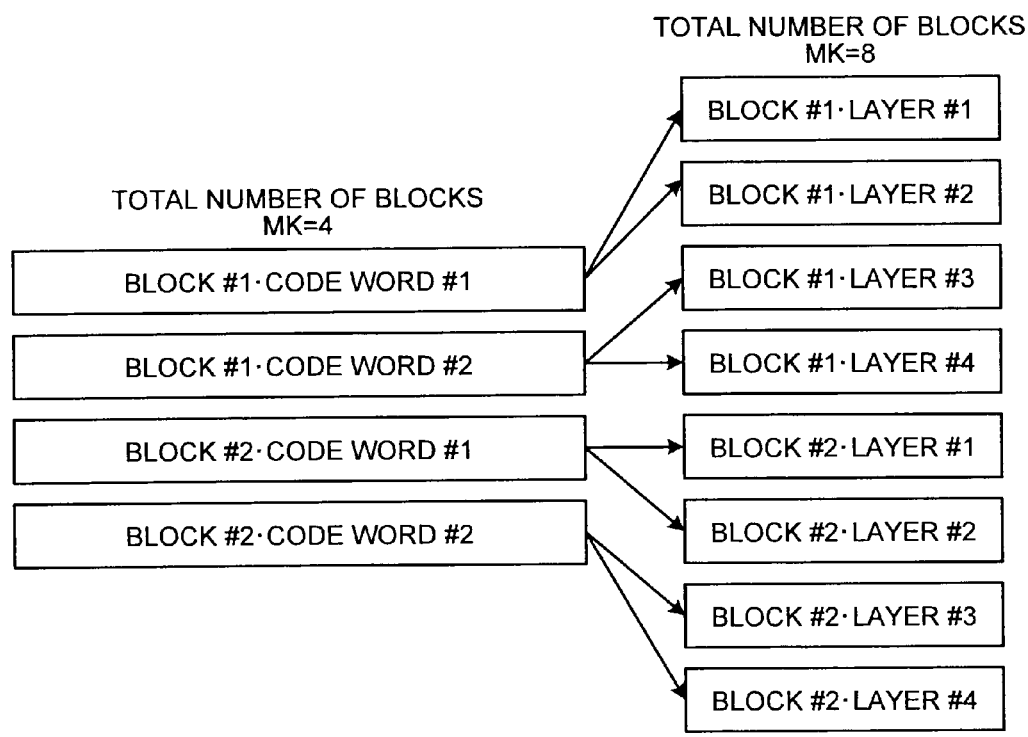
FIG. 19 is a diagram of a processing example of a layer mapping unit.

FIG. 19 is a diagram of a processing example of the layer mapping unit 112. As in the example shown in FIG. 18, it is assumed that the block division number M=2 and the number of code word K=2. It is assumed that the number of transmission antennas is set to N=4. In the example shown in FIG. 19, each of the blocks corresponding to each of the code words is divided into two layers to generate two layers having smaller size, whereby two kinds of code words (the code words #1 and #2) are associated with four layers (layers #1 to #4). The layer mapping information includes information concerning such association of the code words and the layers.

A method of associating the code words and the layers is not limited to this and can be an arbitrary method. For example, a system for distributing even-number-th and odd-number-th symbols among symbols included in a block corresponding to the code word to separate layers can be adopted. The former half and the latter half of the block corresponding to the code word can be distributed to separate layers. The layer mapping unit 112 outputs the MN blocks (the blocks in layer unit) generated in this way to DFT processing units 23-*r* (r=1, 2, . . . , MN), respectively.

Each of the DFT processing units 23-*r* executes DFT on the input block in layer unit and generate a block in the frequency domain. The DFT processing units 23-*r* output the generated blocks in the frequency domain to sub-block dividing units 24-*r*, respectively.

Each of the sub-block dividing units 24-*r* divides the input block in the frequency domain into L sub-blocks based on the sub-block division number L notified from the control unit 11*b*. The sub-block dividing units 24-*r* output the generated L sub-blocks to the frequency allocating unit 14*a*.

The frequency allocating unit 14*a* performs processing for allocating the sub-blocks input from the sub-block dividing units 24-1 to 24-MN within the system band based on working frequency information corresponding to each of the transmission antenna notified from the control unit 11*b*. In this case, the frequency allocating unit 14*a* arranges no signal in other frequency bands in the system band. The control unit 11*b* can indicate, for example, as the working frequency information corresponding to each of the transmission antennas, working frequency information to allocate the sub-blocks to a separate frequency band for each of the transmission antennas.

Figure 20:
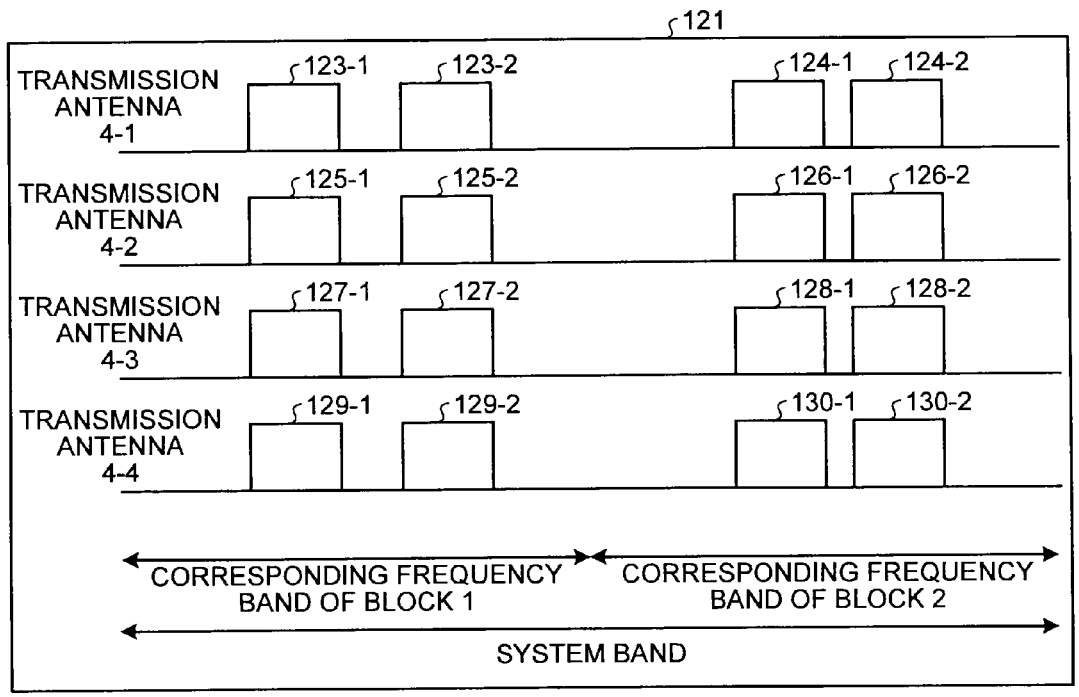
FIG. 20 is a diagram of an example of frequency allocation by a frequency allocating unit.
Figure 20:
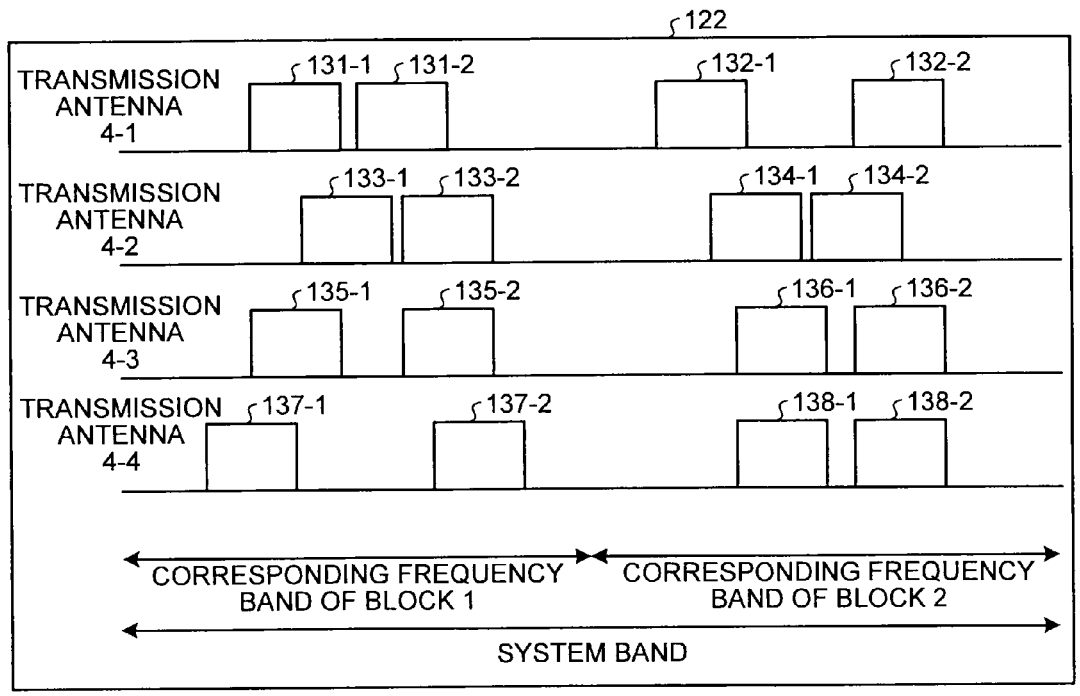

FIG. 20 is a diagram of an example of frequency allocation by the frequency allocating unit 14*a*. In FIG. 20, an example of the block division number M=2, the number of layers N=4, and the sub-block division number L=2 is shown. In FIG. 20, an example in which frequency allocation 121 allocates sub-blocks to the same frequency band among the transmission antennas is shown and an example in which frequency allocation 122 allocates sub-blocks to different frequency bands among the transmission antennas is shown.

In FIG. 20, sub-blocks 123-1 and 123-2 indicate two sub-blocks generated from a block in the frequency domain corresponding to the block #1 and the layer #1 and sub-blocks 124-1 and 124-2 indicate two sub-blocks generated from a block in the frequency domain corresponding to the block #2 and the layer #1. Sub-blocks 125-1 and 125-2 indicate two sub-blocks generated from a block in the frequency domain corresponding to the block #1 and the layer #2 and sub-blocks 126-1 and 126-2 indicate two sub-blocks generated from a block in the frequency domain corresponding to the block #2 and the layer #2.

Sub-blocks 127-1 and 127-2 indicate two sub-blocks generated from a block in the frequency domain corresponding to the block #1 and the layer #3. Sub-blocks 128-1 and 128-2 indicate two blocks generated from a block in the frequency domain corresponding to the block #2 and the layer #3. Sub-blocks 129-1 and 129-2 indicate two sub-blocks generated from a block in the frequency domain corresponding to the block #1 and the layer #4. Sub-blocks 130-1 and 130-2 indicate two sub-blocks generated from a block in the frequency domain corresponding to the block #2 and the layer #4.

Similarly, sub-blocks 131-1 and 131-2 indicate two sub-blocks generated from a block in the frequency domain corresponding to the block #1 and the layer #1. Sub-blocks 132-1 and 132-2 indicate two sub-blocks generated from a block in the frequency domain corresponding to the block #2 and the layer #1. Sub-blocks 133-1 and 133-2 indicate two sub-blocks generated from a block in the frequency domain corresponding to the block #1 and the layer #2. Sub-blocks 134-1 and 134-2 indicate two sub-blocks generated from a block in the frequency domain corresponding to the block #2 and the layer #2. Sub-blocks 135-1 and 135-2 indicate two sub-blocks generated from a block in the frequency domain corresponding to the block #1 and the layer #3.

Further, sub-blocks 136-1 and 136-2 indicate two sub-blocks generated from a block in the frequency domain corresponding to the block #2 and the layer #3. Sub-blocks 137-1 and 137-2 indicate two sub-blocks generated from a block in the frequency domain corresponding to the block #1 and the layer #4. Sub-blocks 138-1 and 138-2 indicate two sub-blocks generated from a block in the frequency domain corresponding to the block #2 and the layer #4.

In this embodiment, to reduce a processing amount for allocation of frequencies, frequency bands used by the blocks for signal transmission in the system band are limited. For example, a frequency band to be used is set for each of the blocks. The frequency allocating unit 14*a* finally outputs sub-blocks, which are allocated to transmission antennas 4-*g* (g=1, 2, . . . , N), to respective inverse DFT/CP adding/frame generating units 113-*g* that correspond to the transmission antennas 4-*g*.

The inverse DFT/CP adding/frame generating units 113-*g* sequentially execute processing same as the processing of the inverse DFT processing unit 15, the CP adding unit 16, the frame generating unit 17, and the reference-signal generating unit 18 according to the first embodiment and output processing results to respective D/A conversion units 2-g. As reference signals, reference signals same as those illustrated in the first embodiment can be applied. However, signal sequences used for the reference signals can be orthogonal to one another among the transmission antennas according to necessity. The reference signals can be adjusted not to be simultaneously transmitted using the same frequency among the transmission antennas. As the following processing, the operations of the high-frequency processing units 3-1 to 3-N and the transmission antennas 4-1 to 4-N are, respectively, the same as the operations of the high-frequency processing unit 3 and the transmission antenna according to the first embodiment.

Figure 21:
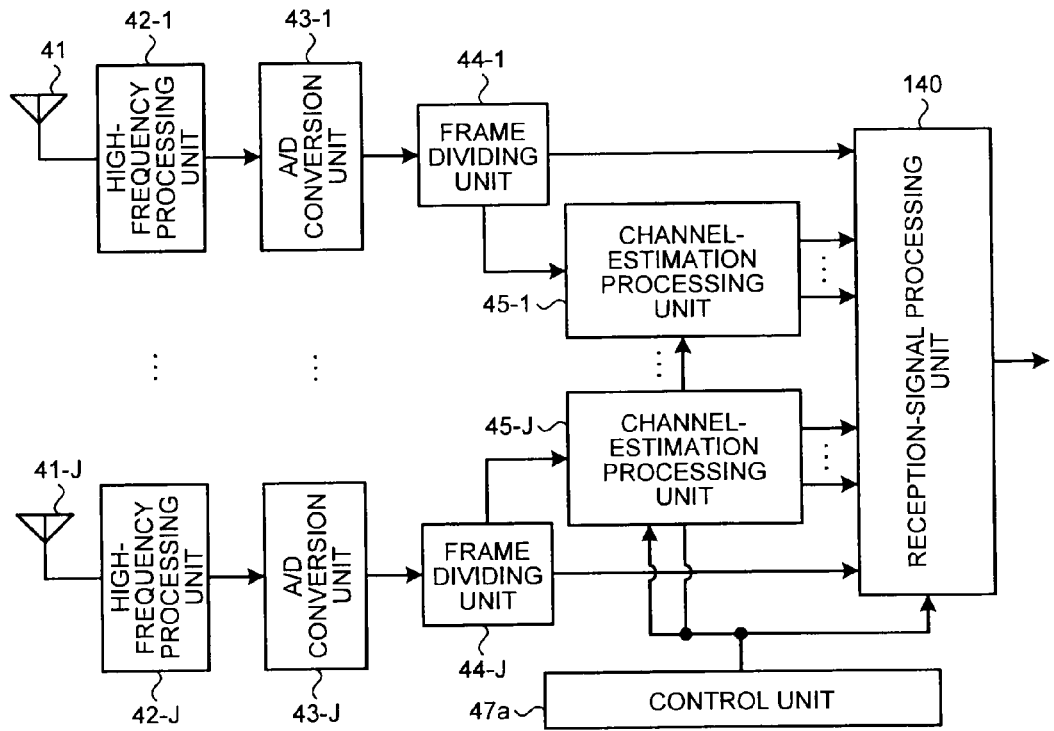
FIG. 21 is a diagram of a functional configuration example of a receiver according to the fourth embodiment.

FIG. 21 is a diagram of a functional configuration example of a receiver according to this embodiment. As shown in FIG. 21, the receiver according to this embodiment includes reception antennas 41-1 to 41-J (J is a natural number), high-frequency processing units 42-1 to 42-J, A/D conversion units 43-1 to 43-J, frame dividing units 44-1 to 44-J, channel-estimation processing units 45-1 to 45-J, a reception-signal processing unit 140, and a control unit 47a. The receiver according to this embodiment is different from the receiver according to the first embodiment in that the number of each of the series of components from the reception antenna to the channel-estimation processing unit is J and the reception-signal processing unit 140 has a function of separately receiving signals simultaneously transmitted from the N transmission antennas of the transmitter.

In addition to the function of the control unit 47 according to the first embodiment, the control unit 47a notifies the reception-signal processing unit 140 and the channel-estimation processing units 45-1 to 45-J of information concerning a working frequency of each of the transmission antennas and layer mapping information. The reception antennas 41-1 to 41-J receive a high-frequency analog reception signal transmitted from the transmitter according to this embodiment. Reception antennas 41-$f$ ($f$=1, 2, . . . , J) output the received high-frequency analog reception signal to high-frequency processing units 42-$f$. High-frequency processing units 42-$f$, A/D conversion units 43-$f$, and frame dividing units 44-$f$ respectively carry out processing same as the processing according to the high-frequency processing unit 42, the A/D conversion unit 43, and the frame dividing unit 44 according to the first embodiment.

The frame dividing unit 44-$f$ outputs separated reception signal sequence and reference signal sequence respectively to the reception-signal processing unit 140 and corresponding channel-estimation processing unit 45-$f$.

In the same manner as the channel-estimation processing unit 45 according to the first embodiment, the channel-estimation processing unit 45-$f$ removes a CP from the reception reference signal sequence and applies DFT to a result of the removal to generate a reception reference signal in the frequency domain. Thereafter, the channel-estimation processing unit 45-$f$ extracts, from the reception reference signal sequence, a signal in a frequency to which a known symbol is allocated. Then, the channel-estimation processing unit 45-$f$ calculates a frequency transfer function of a radio channel in the same manner as the first embodiment. In this embodiment, because the transmitter includes the N transmission antennas, the channel-estimation processing units estimate respective N kinds of different radio channels using known symbols that correspond to the respective N transmission antennas. The channel-estimation processing units 45-$f$ output frequency transfer functions of the estimated N kinds of radio channels to the reception-signal processing unit 140.

Figure 22:
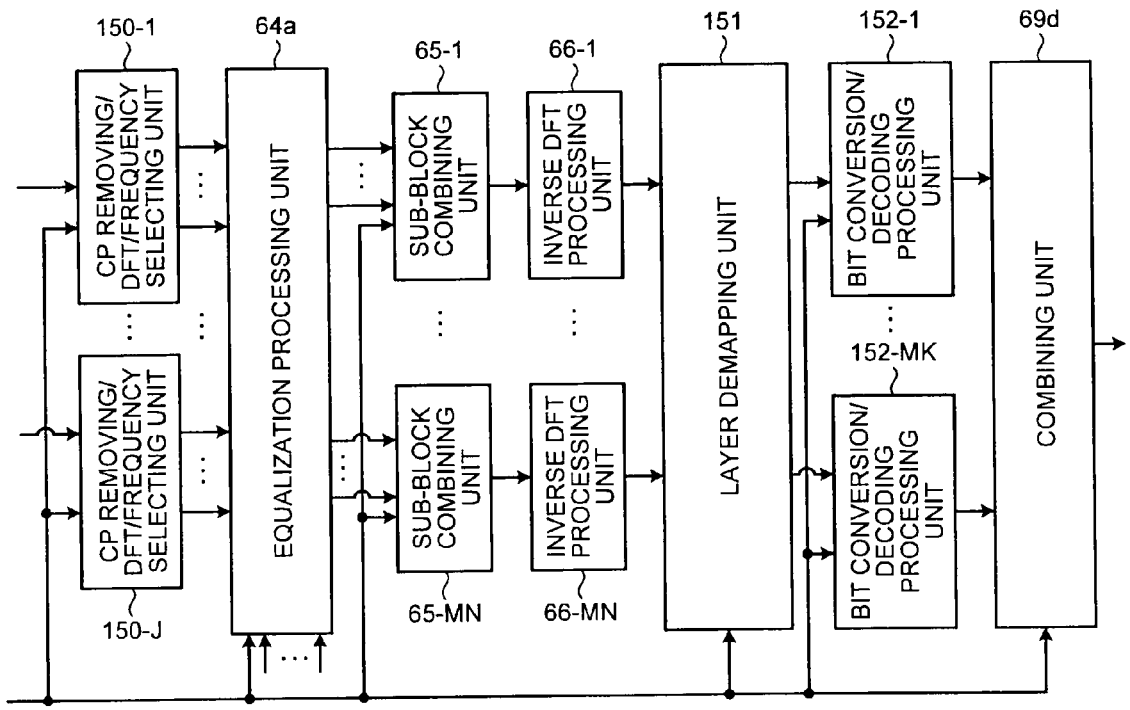
FIG. 22 is a diagram of a configuration example of a reception-signal processing unit according to the fourth embodiment.

The operation of the reception-signal processing unit 140 is explained in detail. FIG. 22 is a diagram of a configuration example of the reception-signal processing unit 140. As shown in FIG. 22, the reception-signal processing unit 140 includes CP removing/DFT/frequency selecting units 150-1 to 150-J, an equalization processing unit 64a, sub-block combining units 65-1 to 65-MN, inverse DFT processing units 66-1 to 66-MN, a layer demapping unit 151, bit conversion/decoding processing units 152-1 to 152-MK, and a combining unit 69d.

The frequency transfer functions of the radio channels input from the channel-estimation processing units 45-1 to 45-J to the reception-signal processing unit 140 are input to the equalization processing unit 64a. Among the parameters input from the control unit 47a, the working frequency information for each of the transmission antennas is output to the CP removing/DFT/frequency selecting units 150-1 to 150-J, the block division number M is output to the CP removing/DFT/frequency selecting units 150-1 to 150-J, the sub-block combining units 65-1 to 65-MN, and the combining unit 69d, the sub-block division number L for dividing each of the blocks is input to the CP removing/DFT/frequency selecting units 150-1 to 150-J and the sub-block combining units 65-1 to 65-MN. Among the parameters input from the control unit 47a, the modulation schemes and the encoding methods for the blocks are input to the bit conversion/decoding processing units 152-1 to 152-MK, respectively, and layer mapping information is input to the layer demapping unit 151.

The CP removing/DFT/frequency selecting unit 150-$f$ applies, based on the working frequency information for each of the transmission antennas, the block division number M, and the sub-block division number L, processing same as the processing of the CP removing unit 61 and the DFT processing unit 62 in the first embodiment to the reception signal sequence input from the frame dividing unit 44-$f$ and generates a reception signal in the frequency domain. Thereafter, the CP removing/DFT/frequency selecting unit 150-$f$ extracts only signals of frequencies allocated to sub-blocks by the transmitter from the reception signal in the frequency domain and outputs the extracted reception signals in the frequency domain to the equalization processing unit 64a. As explained above, in this embodiment, a configuration in which working frequencies are different among the transmission antennas can also be adopted. In such a case, if sub-blocks are allocated to at least one transmission antenna, processing is performed to extract signals of frequencies for the transmission antenna.

The equalization processing unit 64a applies, to the input reception signals in the frequency domain, processing for compensating for distortion suffered in the radio channels and separating signals simultaneously transmitted from the N transmission antennas of the transmitter. This processing can be easily realized by expanding the processing explained concerning the equalization processing unit 64 according to the first embodiment to the case of a plurality of transmission and reception antennas. For example, when a J-dimensional column vector in which reception signals in the frequency domain of a certain frequency are arranged to correspond to J reception antennas is represented as X, an N-dimensional column vector in which transmission signals of a certain frequency are arranged to correspond to N transmission antennas is represented as S, a matrix in which frequency transfer functions of radio channels of a certain frequency are arranged such that column numbers correspond to transmission antenna numbers and row numbers correspond to recep tion antenna numbers is represented as H, and noise components applied in the reception antennas are represented by a J-dimensional vector V, the following Formula (5) holds:

$$X = HS + V \quad (5)$$

Specifically, when calculation indicated by the following Formula (6) is performed according to an idea same as the equalization processing unit according to the first embodiment, the compensation for the distortion suffered in the radio channels and the separation of the signals can be realized and transmission signal estimation values in the frequency domain of N systems can be obtained:

$$H^{-1}X = S + H^{-1}V \quad (6)$$

The transmission signal estimation values in the frequency domain of the N systems are passed to the respective sub-block combining units 65-1 to 65-MN. The sub-block combining units 65-1 to 65-N and the inverse DFT processing units 66-1 to 66-MN respectively perform processing same as the processing of the sub-block combining units 65-1 to 65-M and the inverse DFT processing units 66-1 to 66-M according to the first embodiment. The inverse DFT processing units 66-1 to 66-MN output estimation values of transmission symbols in the time domain obtained by the processing to the layer demapping unit 151.

The layer demapping unit 151 rearranges, based on the layer mapping information received from the control unit 47*a*, the input estimation values of the transmission symbols in the time domain in a form represented by the block division number M and the number of code word K. That is, the layer demapping unit 151 performs reverse processing to the processing of the layer mapping unit 112 in FIG. 17. It is assumed that the layer mapping information output from the control unit 47*a* includes information concerning the association of the code words and the layers performed by the transmitter during the transmission. Processing results of the layer demapping unit are output to the respective bit conversion/decoding processing units 152-1 to 152-MK.

The bit conversion/decoding processing units 152-1 to 152-MK perform processing same as the processing of the bit conversion units 67-1 to 67-M and the decoding units 68-1 to 68-M, and output estimation values of information bit sequences of each of blocks after the processing to the combining unit 69*d*. The combining unit 69*d* performs reverse processing to the processing carried out by the dividing unit 12*d* of the transmitter and restores the information bit sequence.

In this way, in this embodiment, signals can be transmitted from a plurality of transmission antennas and allocation of sub-blocks in the frequency domain can be independently determined among the transmission antennas. Therefore, effects same as those in the first embodiment can be obtained. Further, flexibility of a method of allocating the sub-blocks in the frequency domain increases. As a result, signal transmission can be realized at a high SINR.

In this embodiment, the frequency allocating unit 14*a* allocates sub-blocks to the transmission antennas based on working frequency information for each of the transmission antennas notified from the control unit 11*b*. For example, after the allocation of the sub-blocks to the transmission antennas is determined, allocation methods (working frequencies for each of the transmission antennas, etc.) can be interchanged among the transmission antennas according to transmission timing. Timing for interchanging the allocation methods can be set, for example, in transmission symbol unit, or in slot unit or frame unit obtained by collecting a plurality of transmission symbols. By adopting such a configuration, the quality of received signals is averaged and more satisfactory transmission performance can be obtained in a poor radio transmission environment.

In this embodiment, the number of layers is set equal to the number of transmission antennas N. However, the number of layers is not limited to this. The number of layers can be set to a value different from the number of antennas. In this case, processing for allocating sub-blocks in layer unit to the transmission antennas has to be simply inserted in any position in a latter stage of the layer mapping unit. The layer mapping unit 112 and a component that performs this processing can be collectively considered a mapping unit. In this case, for example, processing of multi-antenna pre-coding for allocating the layers to the transmission antennas by combining the layers after adjusting phases among the layers can be applied. Concerning the multi-antenna pre-coding processing, a general method can be used. For example, a coefficient of multi-antenna pre-coding disclosed in 3GPP TS36.211V8. 6.0 can be used. Higher transmission performance can be realized by using an appropriate pre-coding coefficient according to a radio channel.

As explained in the third embodiment, RRC filter processing units can be respectively arranged between the DFT processing units 23-1 to 23-MN and the sub-block dividing units 24-1 to 24-MN of the transmitter according to this embodiment. In this case, it is possible to suppress a PAPR of signals generated from a processing system in which the RRC filter processing units are arranged. In this case, in the receiver, RRC filter processing units are also arranged between the sub-block combining units 65-1 to 65-MN and the inverse DFT processing units 66-1 to 66-MN.

The receiver can generate contents (the block division number, etc.) of a control signal, which is notified from the control unit 11*b* of the transmitter to the components, and notify the transmitter of the contents of the control signal using a communication channel separately prepared. In this case, it is possible to arrange transmission signals of a plurality of transmitters densely in a system band making use of a configuration in which the receiver appropriately generates control signals for the transmitters, taking advantage of the configuration in which allocation of sub-blocks in the frequency domain can be independently determined among the transmission antennas.

INDUSTRIAL APPLICABILITY

As explained above, the transmitting apparatus and the receiving apparatus according to the present invention are useful for a communication system that employs frequency division multiple access. In particular, the transmitting apparatus and the receiving apparatus are suitable for a communication system that includes a transmitting apparatus including a plurality of SC-FDMA transmission systems that correspond to different frequency bands.

REFERENCE SIGNS LIST

1, 1*a* TRANSMISSION-SIGNAL GENERATING UNIT
2, 2-1 to 2-N D/A CONVERSION UNITS
3, 3-1 to 3-N HIGH-FREQUENCY PROCESSING UNIT
4, 4-1 to 4-N TRANSMISSION ANTENNA
11, 11*a*, 11*b* CONTROL UNIT
12, 12*a*, 12*b*, 12*c*, 12*d* DIVIDING UNIT
13-1 to 13-M SUB-BLOCK GENERATING UNIT
14, 14*a* FREQUENCY ALLOCATING UNIT
15 INVERSE DFT PROCESSING UNIT
16 CP ADDING UNIT

17 FRAME GENERATING UNIT
18 REFERENCE-SIGNAL GENERATING UNIT
21 ENCODING PROCESSING UNIT
22 SYMBOL GENERATING UNIT
23, 23-1 to 23-MN DFT PROCESSING UNITS
24, 24-1 to 24-MN SUB-BLOCK DIVIDING UNITS
31 KNOWN-SYMBOL GENERATING UNIT
32 FREQUENCY ALLOCATING UNIT
33 INVERSE DFT PROCESSING UNIT
34 CP ADDING UNIT
41, 41-1 to 41-J RECEPTION ANTENNA
42, 42-1 to 42-J HIGH-FREQUENCY PROCESSING UNIT
43, 43-1 to 43-J A/D CONVERSION UNIT
44, 44-1 to 44-J FRAME DIVIDING UNIT
45, 45-1 to 45-J CHANNEL-ESTIMATION PROCESSING UNIT
46 RECEPTION-SIGNAL PROCESSING UNIT
47, 47a CONTROL UNIT
51, 61 CP REMOVING UNIT
52, 62 DFT PROCESSING UNIT
53, 63 FREQUENCY SELECTING UNIT
54-1 to 54-M MULTIPLICATION PROCESSING UNIT
64, 64a EQUALIZATION PROCESSING UNIT
65-1 to 65-MN SUB-BLOCK COMBINING UNIT
66-1 to 66-MN INVERSE DFT PROCESSING UNIT
67-1 to 67-M BIT CONVERTING UNIT
68-1 to 68-M DECODING UNIT
69, 69a, 69b, 69c, 69d COMBINING UNIT
71 RRC PROCESSING UNIT
81 to 84 BLOCK
91-1 to 91-M RRC PROCESSING UNIT
100-1, 100-2 BLOCK
101-1, 101-2, 102-1, 102-2, 103-1 to 103-4 SUB-BLOCK
111-1 to 111-MK ENCODING/SYMBOL GENERATION PROCESSING UNIT
112 LAYER MAPPING UNIT
113-1 to 113-N INVERSE DFT/CP ADDING/FRAME GENERATING UNIT
121, 122 FREQUENCY ALLOCATION
123-1, 123-2, 124-1, 124-2, 125-1, 125-2, 126-1, 126-2, 127-1, 127-2, 128-1, 128-2, 129-1, 129-2, 130-1, 130-2, 131-1, 131-2, 132-1, 132-2, 133-1, 133-2, 134-1, 134-2, 135-1, 135-2, 136-1, 136-2, 137-1, 137-2, 138-1, 138-2 SUB-BLOCK
140 RECEPTION-SIGNAL PROCESSING UNIT
150-1 to 150-J CP REMOVING/DFT/FREQUENCY SELECTING UNIT
151 LAYER DEMAPPING UNIT
152-1 to 152-MK BIT CONVERSION/DECODING PROCESSING UNIT
200-1 to 200-12 TRANSMISSION SIGNAL SEQUENCE
201-1, 201-2 REFERENCE SIGNAL

The invention claimed is:

1. A transmitting apparatus that converts a transmission digital signal to a high-frequency analog signal and transmits the high-frequency analog signal using a plurality of transmission frequencies, the transmitting apparatus comprising:
a control unit that controls a block dividing unit to divide a transmission signal sequence into a predetermined number of blocks;
the block dividing unit that divides the transmission signal sequence into the predetermined number of blocks;
a pre-coding unit that applies pre-coding processing to the predetermined number of blocks;
a sub-block dividing unit that further divides the predetermined number of blocks after the pre-coding processing into sub-blocks;
a frequency allocating unit that generates a frequency signal in which the sub-blocks are allocated to the transmission frequencies; and
an inverse discrete Fourier transform unit that transforms the frequency signal into a time signal, wherein
the transmitting apparatus sets the time signal as the transmission digital signal.

2. The transmitting apparatus according to claim 1, further comprising an encoding unit that applies error correction encoding to the predetermined number of blocks, wherein
the pre-coding unit applies the pre-coding processing to the predetermined number of blocks after the error correction encoding.

3. The transmitting apparatus according to claim 1, wherein the transmitting apparatus allocates sub-blocks divided from a same block to frequencies apart from one another as much as possible.

4. The transmitting apparatus according to claim 1, further comprising:
a symbol converting unit that converts the predetermined number of blocks into a modulation symbol; and
a symbol dividing unit that divides the modulation symbol into one or more symbol blocks, wherein
the pre-coding unit applies the pre-coding processing to the symbol blocks.

5. The transmitting apparatus according to claim 1, further comprising:
an encoding unit that applies error correction encoding to the predetermined number of blocks;
an encoded-block dividing unit that divides each of the predetermined number of blocks after the error correction encoding into one or more encoded blocks;
a symbol converting unit that converts the encoded blocks into a modulation symbol; and
a symbol dividing unit that divides the modulation symbol into one or more symbol blocks, wherein
the pre-coding unit applies the pre-coding processing to the symbol blocks.

6. The transmitting apparatus according to claim 1, further comprising a filtering unit that applies filtering processing in a frequency domain to the predetermined number of blocks after the pre-coding, wherein
the sub-block dividing unit sets the predetermined number of blocks after the filtering by the filtering unit as division target blocks.

7. The transmitting apparatus according to claim 1, further comprising a filtering unit that applies filtering processing in a time domain to the predetermined number of blocks after the division by the block dividing unit, wherein
the pre-coding unit sets the predetermined number of blocks after the filtering by the filtering unit as processing target blocks of the pre-coding processing.

8. The transmitting apparatus according to claim 1, wherein the transmitting apparatus uses discrete Fourier transform for the pre-coding processing.

9. The transmitting apparatus according to claim 1, wherein the frequency allocating unit allocates the sub-blocks to the transmission frequencies based on frequency response of a channel.

10. The transmitting apparatus according to claim 1, wherein the transmission frequencies include a plurality of frequency bands not continuous to one another.

11. The transmitting apparatus according to claim 6, wherein the filtering unit performs the filtering processing as filtering processing using an RRC filter.

12. A receiving apparatus that receives a high-frequency analog signal transmitted from the transmitting apparatus according to claim 6 and estimates a transmission signal sequence, which is a signal sequence transmitted by converting the high-frequency analog signal into a baseband digital signal, the receiving apparatus comprising:
- a discrete Fourier transform unit that transforms the baseband digital signal into a frequency signal;
- a frequency extracting unit that extracts signal components of transmission frequencies, which are frequencies used by the transmitting apparatus for transmission, from the frequency signal;
- an equalizing unit that applies waveform equalization to the signal components;
- a sub-block combining unit that combines the signal components after the waveform equalization based on a number of division in division into sub-blocks by the transmitting apparatus;
- a filtering unit that applies filtering processing, which corresponds to the filtering processing performed by the transmitting apparatus, to the signal components combined by the sub-block combining unit;
- an inverse pre-coding unit that applies processing, which is opposite to the pre-coding processing performed by the transmitting apparatus, to the signal components after the filtering processing by the filtering unit; and
- a block combining unit that combines the signal components after the processing of the inverse pre-coding unit based on a number of division in division into blocks by the transmitting apparatus, wherein
- the receiving apparatus estimates the transmission signal sequence based on the signal components combined by the block combining unit.

13. A transmitting apparatus that converts a transmission digital signal to a high-frequency analog signal and transmits the high-frequency analog signal using a plurality of transmission frequencies, the transmitting apparatus comprising:
- a block dividing unit that divides a transmission signal sequence into one or more blocks;
- a pre-coding unit that applies pre-coding processing to the blocks;
- a sub-block dividing unit that further divides the blocks after the pre-coding processing into sub-blocks;
- a frequency allocating unit that generates a frequency signal in which the sub-blocks are allocated to the transmission frequencies;
- an inverse discrete Fourier transform unit that transforms the frequency signal into a time signal, wherein the transmitting apparatus sets the time signal as the transmission digital signal;
- an encoding unit that applies error correction encoding to the blocks; and
- an encoded-block dividing unit that divides each of the blocks after the error correction encoding into one or more encoded blocks, wherein
- the pre-coding unit applies the pre-coding processing to the encoded blocks.

14. The transmitting apparatus according to claim 13, wherein the transmitting apparatus makes a number of division by the encoded-block dividing unit variable.

15. A transmitting apparatus that converts a transmission digital signal to a high-frequency analog signal and transmits the high-frequency analog signal using a plurality of transmission frequencies, the transmitting apparatus comprising:
- a block dividing unit that divides a transmission signal sequence into one or more blocks;
- a plurality of transmission antennas;
- a mapping unit that divides the one or more blocks according to a number of the transmission antennas and allocates the one or more blocks to the transmission antennas;
- a pre-coding unit that applies pre-coding processing to the blocks;
- a sub-block dividing unit that further divides the blocks after the pre-coding processing into sub-blocks;
- a frequency allocating unit that generates a frequency signal in which the sub-blocks are allocated to the transmission frequencies; and
- an inverse discrete Fourier transform unit that transforms the frequency signal into a time signal, wherein the transmitting apparatus sets the time signal as the transmission digital signal, wherein
- the transmitting apparatus allocates the transmission frequencies to the transmission antennas as frequencies for each antenna, and
- the frequency allocating unit generates, for each of the transmission antennas, a frequency signal in which the sub-blocks allocated by the mapping unit are respectively allocated to the frequencies for each antenna.

16. The transmitting apparatus according to claim 15, wherein the transmitting apparatus makes it possible to interchange the frequencies for each antenna among the transmission antennas.

17. A receiving apparatus that receives a high-frequency analog signal transmitted from the transmitting apparatus according to claim 15 and estimates a transmission signal sequence, which is a signal sequence obtained by converting the high-frequency analog signal into a baseband digital signal and transmitting the baseband digital signal, the receiving apparatus comprising:
- a plurality of reception antennas;
- a discrete Fourier transform unit that transforms, for each of the reception antennas, the baseband digital signal into a frequency signal;
- a frequency extracting unit that extracts, for each of the reception antennas, signal components of transmission frequencies, which are frequencies used by the transmitting apparatus for transmission, from the frequency signal;
- an equalizing unit that applies waveform equalization to the signal components;
- a sub-block combining unit that combines the signal components after the waveform equalization based on a number of division in division into sub-blocks by the transmitting apparatus;
- an inverse pre-coding unit that applies processing, which is opposite to the pre-coding processing performed by the transmitting apparatus, to the signal components combined by the sub-block combining unit; and
- a block combining unit that combines the signal components after the processing of the inverse pre-coding unit based on a number of divisions in division into blocks by the transmitting apparatus, wherein
- the receiving apparatus estimates the transmission signal sequence based on the signal components combined by the block combining unit.

* * * * *